United States Patent
Peng et al.

(10) Patent No.: US 10,750,422 B2
(45) Date of Patent: Aug. 18, 2020

(54) METHOD FOR HANDOVER BETWEEN INTER-RAT CELLS AND APPARATUS

(71) Applicant: HUAWEI TECHNOLOGIES CO., LTD., Shenzhen, Guangdong (CN)

(72) Inventors: Wenjie Peng, Shanghai (CN); Hongzhuo Zhang, Shanghai (CN); Xiaoli Shi, Shanghai (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 16/188,888

(22) Filed: Nov. 13, 2018

(65) Prior Publication Data

US 2019/0082368 A1 Mar. 14, 2019

Related U.S. Application Data

(63) Continuation of application No. PCT/CN2016/082089, filed on May 13, 2016.

(51) Int. Cl.
*H04W 36/30* (2009.01)
*H04W 36/00* (2009.01)
(Continued)

(52) U.S. Cl.
CPC ........... *H04W 36/30* (2013.01); *H04W 36/00* (2013.01); *H04W 36/0058* (2018.08);
(Continued)

(58) Field of Classification Search
CPC ...... H04W 36/14; H04W 88/06; H04W 48/16
See application file for complete search history.

(56) References Cited

U.S. PATENT DOCUMENTS

| | | |
|---|---|---|
| 2009/0147753 A1 | 6/2009 | Tashiro et al. |
| 2013/0163563 A1 | 6/2013 | Sha et al. |

(Continued)

FOREIGN PATENT DOCUMENTS

| | | |
|---|---|---|
| CN | 101466127 A | 6/2009 |
| CN | 101895945 A | 11/2010 |

(Continued)

OTHER PUBLICATIONS

International Search Report dated Jan. 25, 2017 in corresponding International Application No. PCT/CN2016/082089.
(Continued)

*Primary Examiner* — Chandrahas B Patel
(74) *Attorney, Agent, or Firm* — Womble Bond Dickinson (US) LLP

(57) ABSTRACT

The present application discloses a method and an apparatus. In the present application, a radio access network RAN server receives a measurement report from a terminal, determines a target inter-RAT cell of the terminal based on the measurement report, and configures a resource for the terminal in the target inter-RAT cell. The configured resource is a resource to be used by the terminal to access the target inter-RAT cell. The RAN server sends a handover command to the terminal. The handover command is used to instruct the terminal to hand over to the target inter-RAT cell, and the handover command carries an identifier of the target inter-RAT cell and information about the configured resource. In this way, when handover is performed between inter-RAT cells, handover can be implemented without across core networks, thereby reducing signaling exchange between a source core network and a target core network.

13 Claims, 9 Drawing Sheets

(51) Int. Cl.
*H04W 36/08* (2009.01)
*H04W 88/06* (2009.01)
*H04W 88/08* (2009.01)

(52) U.S. Cl.
CPC ... *H04W 36/0061* (2013.01); *H04W 36/0066* (2013.01); *H04W 36/0072* (2013.01); *H04W 36/0088* (2013.01); *H04W 36/08* (2013.01); *H04W 88/06* (2013.01); *H04W 88/085* (2013.01)

(56) References Cited

U.S. PATENT DOCUMENTS

| | | |
|---|---|---|
| 2013/0329694 A1 | 12/2013 | Vrzic et al. |
| 2014/0254554 A1 | 9/2014 | Liu et al. |
| 2016/0219484 A1 | 7/2016 | Bontu et al. |
| 2016/0286449 A1 | 9/2016 | Choi et al. |

FOREIGN PATENT DOCUMENTS

| | | | |
|---|---|---|---|
| CN | 102164389 A | 8/2011 | |
| CN | 102378294 A | 3/2012 | |
| CN | 103582044 A | 2/2014 | |
| CN | 104041120 B | 9/2014 | |
| CN | 104782178 A | 7/2015 | |
| CN | 105210416 A | 12/2015 | |
| EP | 1732269 A1 | 12/2006 | |
| EP | 2541985 A1 * | 1/2013 | ........ H04W 36/0066 |
| EP | 2541985 A1 | 1/2013 | |
| EP | 2254367 B1 | 4/2013 | |
| EP | 2584835 A1 | 4/2013 | |
| EP | 2884803 A1 | 6/2015 | |
| WO | 2012159399 A1 | 11/2012 | |

OTHER PUBLICATIONS

LG Electronics Inc., "PDCP retransmissions," 3GPP TSG RAN WG2 #59bis, Oct. 8-12, 2008, Shanghai, China, R2-074218, (R2-073041), pp. 1-3.

International Search Report, dated Jan. 25, 2017, in International Application No. PCT/CN2016/082089 (4 pages).

Extended European Search Report, dated Jan. 16, 2019, in European Application No. 16901342.2 (12 pages).

* cited by examiner

A radio access network RAN server receives a measurement report sent by a terminal, where the measurement report includes an identifier of a neighboring inter-RAT cell of a serving cell in which the terminal is located and a measured value of the neighboring inter-RAT cell — 101

The RAN server determines a target inter-RAT cell of the terminal based on the measurement report, and configures a resource for the terminal in the target inter-RAT cell, where the configured resource is a resource to be used by the terminal to access the target inter-RAT cell — 102

The RAN server sends a handover command to the terminal, where the handover command message is used to instruct the terminal to hand over to the target inter-RAT cell, the handover command carries an identifier of the target inter-RAT cell and information about the configured resource, the RAN server is configured to manage the serving cell and the target inter-RAT cell of the terminal, and a communication RAT used by the serving cell is different from a communication RAT used by the target inter-RAT cell — 103

FIG. 1C

A first access network device receives a measurement report, where the measurement report includes an identifier of a neighboring inter-RAT cell of a serving cell in which the terminal is located and a measured value of the neighboring inter-standard cell — 201

The first access network device determines a target inter-RAT cell of the terminal based on the measurement report — 202

The first access network device sends a handover request message to a second access network device through a communications interface between the first access network device and the second access network device to which the target inter-RAT cell belongs, where the handover request message is used to request the second access network device to configure a resource for the terminal in the target inter-RAT cell, the handover request message carries an identifier of the terminal and an identifier of the target inter-RAT cell, and the configured resource is a resource to be used by the terminal to access the target inter-RAT cell — 203

The first access network device receives, through the communications interface, a handover response message sent by the second access network device, where the handover response message carries information about the configured resource — 204

The first access network device sends a handover command to the terminal, where the handover command is used to instruct the terminal to hand over to the target inter-RAT cell, the handover command carries the identifier of the target inter-RAT cell and the information about the configured resource, and a communication RAT used by the serving cell is different from a communication RAT used by the target inter-RAT cell — 205

FIG. 2

METHOD FOR HANDOVER BETWEEN INTER-RAT CELLS AND APPARATUS

CROSS-REFERENCE TO RELATED APPLICATIONS

This application is a continuation of International Application No. PCT/CN2016/082089, filed on May 13, 2016, the disclosure of which is hereby incorporated by reference in its entirety.

TECHNICAL FIELD

The present application relates to the field of communications technologies, and in particular, to a method for handover between inter-RAT cells and an apparatus.

BACKGROUND

With rapid development of communications technologies, various inter-RAT networks emerge as the times require, such as a Global System for Mobile Communications (GSM) network, a Wideband Code Division Multiple Access (WCDMA) network, and a Long Term Evolution (LTE) network. The plurality of inter-RAT networks correspond to a plurality of inter-RAT cells. As the plurality of inter-RAT cells have wide coverage, in a movement process of a terminal that accesses a cell, it is very possible that the terminal moves from a cell of one RAT (radio access technology) to a cell of another RAT, for example, from a cell of a WCDMA network to a cell of an LTE network. Therefore, to ensure that the terminal can always keep an access state in the movement process, the terminal needs to hand over between the inter-RAT cells.

Currently, a network architecture includes a plurality of types of core networks, and each type of core network can support a cell of only one RAT. For example, an LTE core network can support a cell of only an LTE network. Therefore, if a terminal is handed over between two inter-RAT cells, core networks of the two inter-RAT cells need to be crossed. A specific implementation process thereof includes: If the terminal moves from a source cell to a target cell, a source core network sends a handover request message to a target core network, and the target core network prepares a resource for the terminal after receiving the handover request message. Then, the target core network sends a handover response message to the source core network. The handover response message is used to indicate the resource already prepared by the target core network, and the handover response message carries configuration information corresponding to the resource. After receiving the handover response message, the source core network sends a handover command to the terminal by using a source base station. The handover command carries the configuration information. After receiving the handover command, the terminal is handed over to the target cell based on the configuration information, thereby implementing handover between the inter-RAT cells.

In the foregoing implementation process, the inventor finds that the prior art has at least the following problem: If a terminal is handed over between two inter-RAT cells, core networks need to be crossed in a handover process, and a large amount of signaling exchange exists between a source core network and a target core network, leading to a relatively large handover delay.

SUMMARY

To resolve a problem in the prior art, embodiments of the present application provide a method for handover between inter-RAT cells and an apparatus. The technical solutions are as follows:

According to a first aspect, a method for handover between inter-RAT cells is provided. The method includes:

receiving, by a radio access network RAN server, a measurement report sent by a terminal, where the measurement report includes an identifier of a neighboring inter-RAT cell of a serving cell in which the terminal is located and a measured value of the neighboring inter-RAT cell;

determining, by the RAN server, a target inter-RAT cell of the terminal based on the measurement report, and configuring a resource for the terminal in the target inter-RAT cell, where the configured resource is a resource to be used by the terminal to access the target inter-RAT cell; and sending, by the RAN server, a handover command to the terminal, where the handover command is used to instruct the terminal to hand over to the target inter-RAT cell, and the handover command carries an identifier of the target inter-RAT cell and information about the configured resource.

The RAN server is configured to manage the serving cell and the target inter-RAT cell of the terminal, and a communication RAT used by the serving cell is different from a communication RAT used by the target inter-RAT cell.

In this embodiment of the present application, after receiving the measurement report sent by the terminal, the RAN server determines the target inter-RAT cell based on the measurement report. The RAN server configures the resource for the terminal in the target inter-RAT cell, and sends the information about the configured resource and the identifier of the target inter-RAT cell to the terminal, so that the terminal is handed over to the target inter-RAT cell. In this way, no core network needs to be crossed when handover is performed between inter-RAT cells, thereby reducing signaling exchange between a source core network and a target core network.

With reference to the first aspect, in a first possible implementation of the first aspect, before the sending, by the RAN server, a handover command to the terminal, the method further includes:

sending the information about the configured resource to an access point to which the target inter-RAT cell belongs, so that the access point performs resource configuration based on the information about the configured resource.

In this embodiment of the present application, the RAN server sends the information about the configured resource to the access point to which the target inter-RAT cell belongs, so that the access point to which the target inter-RAT cell belongs performs resource configuration based on the information about the configured resource. In this way, the terminal can access the access point, namely, access the target inter-RAT cell.

With reference to any possible implementation of the first aspect, in a second possible implementation of the first aspect, after the sending, by the RAN server, a handover command to the terminal, the method further includes:

sending a RAT indication message to a core network device, where the RAT indication message carries an identifier of the terminal and RAT information of the target inter-RAT cell, and the RAT information is used to indicate the communication RAT used by the target inter-RAT cell.

In this embodiment of the present application, after sending the handover command to the terminal, the RAN server further sends the RAT indication message to the core network device, so that the core network device can perform a further operation based on the RAT indication message, for example, change a charging policy, a security mechanism, and the like for the terminal, thereby ensuring integrity of the handover between the inter-RAT cells.

According to a second aspect, a method for handover between inter-RAT cells is provided. The method includes:

receiving, by a first access network device, a measurement report sent by a terminal, where the measurement report includes an identifier of a neighboring inter-RAT cell of a serving cell in which the terminal is located and a measured value of the neighboring inter-RAT cell;

determining, by the first access network device, a target inter-RAT cell of the terminal based on the measurement report;

sending, by the first access network device, a handover request message to a second access network device through a communications interface between the first access network device and the second access network device to which the target inter-RAT cell belongs, where the handover request message is used to request the second access network device to configure a resource for the terminal in the target inter-RAT cell, the handover request message carries an identifier of the terminal and an identifier of the target inter-RAT cell, and the configured resource is a resource to be used by the terminal to access the target inter-RAT cell;

receiving, by the first access network device through the communications interface, a handover response message sent by the second access network device, where the handover response message carries information about the configured resource; and sending, by the first access network device, a handover command to the terminal, where the handover command is used to instruct the terminal to hand over to the target inter-RAT cell, and the handover command carries the identifier of the target inter-RAT cell and the information about the configured resource.

A communication RAT used by the serving cell is different from a communication RAT used by the target inter-RAT cell.

In this embodiment of the present application, after the first access network device determines the target inter-RAT cell based on the measurement report, when an access point corresponding to the target inter-RAT cell does not belong to the first access network device, the first access network device sends the handover request message to the second access network device through the communications interface between the first access network device and the second access network device to which the target inter-RAT cell belongs, so that the second access network device configures the resource for the terminal in the target inter-RAT cell, and returns the information about the configured resource to the first access network device. Then, the first access network device sends the information about the configured resource to the terminal, so that the terminal accesses the target inter-RAT cell. No core network needs to be crossed in a process of handover between inter-RAT cells, thereby reducing signaling exchange between a source core network and a target core network.

With reference to the second aspect, in a first possible implementation of the second aspect, both the first access network device and the second access network device are radio access network RAN servers; or both the first access network device and the second access network device are base stations.

In this embodiment of the present application, both the first access network device and the second access network device may be RAN servers or base stations, increasing applicability of the handover between the inter-RAT cells.

With reference to any possible implementation of the second aspect, in a second possible implementation of the second aspect, after the sending, by the first access network device, a handover command to the terminal, the method further includes:

sending, by the first access network device, a sequence number state transition message to the second access network device, where the sequence number state transition message carries at least one of a sequence number of a data packet not successfully sent to the terminal and a sequence number of a data packet lost in a transmission process, the sequence number of the data packet not successfully sent to the terminal is used by the second access network device to resend a data packet corresponding to the sequence number of the data packet not successfully sent to the terminal, and the sequence number of the data packet lost in the transmission process is used by the second access network device to request the terminal to resend a data packet corresponding to the sequence number of the data packet lost in the transmission process.

In this embodiment of the present application, in the process of the handover between the inter-RAT cells, the first access network device sends the sequence number state transition message to the second access network device, so that when the sequence number state transition message includes the sequence number of the data packet not successfully sent to the terminal, the second access network device resends a data packet corresponding to the sequence number of the data packet not successfully sent to the terminal; when the sequence number state transition message includes the sequence number of the data packet lost in the transmission process, the second access network device requests the terminal to resend the corresponding data packet; or when the sequence number state transition message includes the sequence number of the data packet not successfully sent to the terminal and the sequence number of the data packet lost in the transmission process, the second access network device resends a data packet corresponding to the sequence number of the data packet not successfully sent to the terminal, and requests the terminal to resend the corresponding data packet. In this way, lost data packets can be minimized in the handover process, thereby improving data transmission reliability.

With reference to any one of the foregoing possible implementations of the second aspect, in a third possible implementation of the second aspect, before the receiving, by a first access network device, a measurement report sent by a terminal, the method further includes:

receiving, when a communication connection between the first access network device and the second access network device is established, a device identifier of the second access network device, and cell identifiers and communication RAT information of all cells managed by the second access network device that are sent by the second access network device.

In this embodiment of the present application, when the communication connection between the first access network device and the second access network device is established, device identifiers of the access network devices, and cell identifiers and communication RAT information of all cells managed by the access network devices are exchanged, so that the first access network device can determine, based on the identifier of the determined target inter-RAT cell, the second access network device to which the target inter-RAT cell belongs.

According to a third aspect, a method for handover between inter-RAT cells is provided. The method includes:

receiving, by a second access network device, a handover request message sent by a first access network device, where the handover request message carries an identifier of a terminal and an identifier of a target inter-RAT cell, and the first access network device is an access network device to which a serving cell in which the terminal is located belongs;

configuring, by the second access network device, a resource for the terminal in the target inter-RAT cell based on the handover request message; and sending, by the second access network device, a handover response message to the first access network device, where the handover response message carries information about the configured resource.

A communication RAT used by the serving cell is different from a communication RAT used by the target inter-RAT cell.

In this embodiment of the present application, after receiving the handover request message sent by the first access network device, the second access network device configures the resource for the terminal in the target inter-RAT cell based on the identifier of the terminal and the identifier of the target inter-RAT cell, and sends the information about the configured resource to the first access network device. The first access network device obtains the information about the configured resource and sends the information about the configured resource and the identifier of the target inter-RAT cell to the terminal, so that the terminal is handed over to the target inter-RAT cell. No core network needs to be crossed in a process of handover between inter-RAT cells, thereby reducing signaling exchange between a source core network and a target core network.

With reference to the third aspect, in a first possible implementation of the third aspect, both the first access network device and the second access network device are radio access network RAN servers; or both the first access network device and the second access network device are base stations.

In this embodiment of the present application, both the first access network device and the second access network device may be RAN servers or base stations, increasing applicability of the handover between the inter-RAT cells.

With reference to any possible implementation of the third aspect, in a second possible implementation of the third aspect, after the sending, by the second access network device, a handover response message to the first access network device, the method further includes:

sending, by the second access network device, a path switching request message to a core network device, where the path switching request message carries RAT information of the target inter-RAT cell, and the RAT information is used to indicate the communication RAT used by the target inter-RAT cell; and receiving, by the second access network device, a path switching response message sent by the core network device, where the path switching response message carries data channel information, and the data channel information is used to indicate a channel for transmitting data between the core network device and the terminal.

In this embodiment of the present application, when an access point to which the target inter-RAT cell belongs does not belong to the first access network device, a path for transmitting the data between the core network device and the terminal also changes. To be specific, transmitting the data between the core network device and the terminal by using the first access network device changes to transmitting the data between the core network device and the terminal by using the second access network device. Therefore, the second access network device sends the path switching request message to the core network device, so that the core network device establishes a data channel to the second access network device. In addition, the path switching request message carries the RAT information of the target inter-RAT cell, so that the core network device can perform further processing based on the RAT information of the target inter-RAT cell, for example, change a charging policy and the like for the terminal.

With reference to any one of the foregoing possible implementations of the third aspect, in a third possible implementation of the third aspect, before the sending, by the second access network device, a handover response message to the first access network device, the method further includes:

sending, by the second access network device, the information about the configured resource to a target access point to which the target inter-RAT cell belongs, so that the target access point performs resource configuration based on the information about the configured resource.

In this embodiment of the present application, the second access network device sends the information about the configured resource to the target access point to which the target inter-RAT cell belongs, so that the target access point to which the target inter-RAT cell belongs can perform resource configuration based on the information about the configured resource, and further, the terminal can access the target inter-RAT cell.

With reference to any one of the foregoing possible implementations of the third aspect, in a fourth possible implementation of the third aspect, after the receiving a path switching response message sent by the core network device, the method further includes:

receiving, by the second access network device, a sequence number state transition message sent by the first access network device, where the sequence number state transition message carries at least one of a sequence number of a data packet not successfully sent to the terminal and a sequence number of a data packet lost in a transmission process; and if the sequence number state transition message carries the sequence number of the data packet not successfully sent to the terminal, resending, by the second access network device, a data packet corresponding to the sequence number of the data packet not successfully sent to the terminal; and/or if the sequence number state transition message carries the sequence number of the data packet lost in the transmission process, sending, by the second access network device, a retransmission request message, where the retransmission request message is used to request the terminal to resend a data packet corresponding to the sequence number of the data packet lost in the transmission process.

In this embodiment of the present application, in the process of the handover between the inter-RAT cells, the second access network device receives the sequence number state transition message sent by the first access network device, so that when the sequence number state transition message includes the sequence number of the data packet not successfully sent to the terminal, the second access network device resends a data packet corresponding to the sequence number of the data packet not successfully sent to the terminal; when the sequence number state transition message includes the sequence number of the data packet lost in the transmission process, the second access network device requests the terminal to resend the corresponding data packet; or when the sequence number state transition message includes the sequence number of the data packet not successfully sent to the terminal and the sequence number of the data packet lost in the transmission process, the second access network device resends a data packet corresponding to the sequence number of the data packet not successfully sent to the terminal, and requests the terminal to resend the corresponding data packet. In this way, lost data packets can be minimized in the handover process, thereby improving data transmission reliability.

With reference to any one of the foregoing possible implementations of the third aspect, in a fifth possible implementation of the third aspect, before the receiving, by a second access network device, a handover request message sent by a first access network device, the method further includes:

sending, when a communication connection between the first access network device and the second access network device is established, a device identifier of the second access network device, and cell identifiers and communication RAT information of all cells managed by the second access network device to the first access network device.

In this embodiment of the present application, when the communication connection between the first access network device and the second access network device is established, device identifiers of the access network devices, and cell identifiers and communication RAT information of all cells managed by the access network devices are exchanged, so that the first access network device can determine, based on the identifier of the determined target inter-RAT cell, the second access network device to which the target inter-RAT cell belongs.

According to a fourth aspect, a radio access network RAN server is provided. The RAN server includes:

a receiving module, configured to receive a measurement report sent by a terminal, where the measurement report includes an identifier of a neighboring inter-RAT cell of a serving cell in which the terminal is located and a measured value of the neighboring inter-RAT cell;

a determining module, configured to determine a target inter-RAT cell of the terminal based on the measurement report received by the receiving module, and configure a resource for the terminal in the target inter-RAT cell, where the configured resource is a resource to be used by the terminal to access the target inter-RAT cell; and a sending module, configured to send a handover command to the terminal, where the handover command is used to instruct the terminal to hand over to the target inter-RAT cell determined by the determining module, and the handover command carries an identifier of the target inter-RAT cell and information about the configured resource.

The RAN server is configured to manage the serving cell and the target inter-RAT cell of the terminal, and a communication RAT used by the serving cell is different from a communication RAT used by the target inter-RAT cell.

With reference to the fourth aspect, in a first possible implementation of the fourth aspect, the sending module is further configured to:

send the information about the configured resource to an access point to which the target inter-RAT cell belongs, so that the access point performs resource configuration based on the information about the configured resource.

With reference to any possible implementation of the fourth aspect, in a second possible implementation of the fourth aspect, the sending module is further configured to:

send a RAT indication message to a core network device, where the RAT indication message carries an identifier of the terminal and RAT information of the target inter-RAT cell, and the RAT information is used to indicate the communication RAT used by the target inter-RAT cell.

According to a fifth aspect, a first access network device is provided. The first access network device includes:

a first receiving module, configured to receive a measurement report sent by a terminal, where the measurement report includes an identifier of a neighboring inter-RAT cell of a serving cell in which the terminal is located and a measured value of the neighboring inter-RAT cell;

a determining module, configured to determine a target inter-RAT cell of the terminal based on the measurement report received by the first receiving module;

a first sending module, configured to send a handover request message to a second access network device through a communications interface between the first access network device and the second access network device to which the target inter-RAT cell determined by the determining module belongs, where the handover request message is used to request the second access network device to configure a resource for the terminal in the target inter-RAT cell, the handover request message carries an identifier of the terminal and an identifier of the target inter-RAT cell, and the configured resource is a resource to be used by the terminal to access the target inter-RAT cell;

a second receiving module, configured to receive, through the communications interface, a handover response message sent by the second access network device, where the handover response message carries information about the configured resource; and a second sending module, configured to send a handover command to the terminal, where the handover command is used to instruct the terminal to hand over to the target inter-RAT cell, and the handover command carries the identifier of the target inter-RAT cell and the information about the configured resource that is received by the second receiving module.

A communication RAT used by the serving cell is different from a communication RAT used by the target inter-RAT cell.

With reference to the fifth aspect, in a first possible implementation of the fifth aspect, both the first access network device and the second access network device are radio access network RAN servers; or both the first access network device and the second access network device are base stations.

With reference to any possible implementation of the fifth aspect, in a second possible implementation of the fifth aspect, the second sending module is further configured to:

send a sequence number state transition message to the second access network device, where the sequence number state transition message carries at least one of a sequence number of a data packet not successfully sent to the terminal and a sequence number of a data packet lost in a transmission process, the sequence number of the data packet not successfully sent to the terminal is used by the second access network device to resend a data packet corresponding to the sequence number of the data packet not successfully sent to the terminal, and the sequence number of the data packet lost in the transmission process is used by the second access network device to request the terminal to resend a data packet corresponding to the sequence number of the data packet lost in the transmission process.

With reference to any one of the foregoing possible implementations of the fifth aspect, in a third possible implementation of the fifth aspect, the first receiving module is further configured to receive, when a communication connection between the first access network device and the second access network device is established, a device identifier of the second access network device, and cell identifiers and communication RAT information of all cells managed by the second access network device that are sent by the second access network device.

According to a sixth aspect, a second access network device is provided. The second access network device includes:

a receiving module, configured to receive a handover request message sent by a first access network device, where the handover request message carries an identifier of a terminal and an identifier of a target inter-RAT cell, and the first access network device is an access network device to which a serving cell in which the terminal is located belongs;

a configuration module, configured to configure a resource for the terminal in the target inter-RAT cell based on the handover request message received by the receiving module; and a sending module, configured to send a handover response message to the first access network device, where the handover response message carries information about the resource configured by the configuration module.

A communication RAT used by the serving cell is different from a communication RAT used by the target inter-RAT cell.

With reference to the sixth aspect, in a first possible implementation of the sixth aspect, both the first access network device and the second access network device are radio access network RAN servers; or both the first access network device and the second access network device are base stations.

With reference to any possible implementation of the sixth aspect, in a second possible implementation of the sixth aspect, the sending module is further configured to send a path switching request message to a core network device, where the path switching request message carries RAT information of the target inter-RAT cell, and the RAT information is used to indicate the communication RAT used by the target inter-RAT cell; and the receiving module is further configured to receive a path switching response message sent by the core network device, where the path switching response message carries data channel information, and the data channel information is used to indicate a channel for transmitting data between the core network device and the terminal.

With reference to any one of the foregoing possible implementations of the sixth aspect, in a third possible implementation of the sixth aspect, the sending module is further configured to:

send the information about the configured resource to a target access point to which the target inter-RAT cell belongs, so that the target access point performs resource configuration based on the information about the configured resource.

With reference to any one of the foregoing possible implementations of the sixth aspect, in a fourth possible implementation of the sixth aspect, the receiving module is further configured to receive a sequence number state transition message sent by the first access network device, where the sequence number state transition message carries at least one of a sequence number of a data packet not successfully sent to the terminal and a sequence number of a data packet lost in a transmission process; and the sending module is further configured to: when the sequence number state transition message received by the receiving module carries the sequence number of the data packet not successfully sent to the terminal, resend a data packet corresponding to the sequence number of the data packet not successfully sent to the terminal; or the sending module is further configured to: when the sequence number state transition message received by the receiving module carries the sequence number of the data packet lost in the transmission process, send a retransmission request message, where the retransmission request message is used to request the terminal to resend a data packet corresponding to the sequence number of the data packet lost in the transmission process.

With reference to any one of the foregoing possible implementations of the sixth aspect, in a fifth possible implementation of the sixth aspect, the sending module is further configured to:

send, when a communication connection between the first access network device and the second access network device is established, a device identifier of the second access network device, and cell identifiers and communication RAT information of all cells managed by the second access network device to the first access network device.

According to a seventh aspect, a radio access network RAN server is provided. The RAN server includes a transmitter, a receiver, and a processor connected to both the transmitter and the receiver, where the receiver is configured to receive a measurement report sent by a terminal, where the measurement report includes an identifier of a neighboring inter-RAT cell of a serving cell in which the terminal is located and a measured value of the neighboring inter-RAT cell;

the processor is configured to determine a target inter-RAT cell of the terminal based on the measurement report received by the receiver, and configure a resource for the terminal in the target inter-RAT cell, where the configured resource is a resource to be used by the terminal to access the target inter-RAT cell; and the transmitter is configured to send a handover command to the terminal, where the handover command is used to instruct the terminal to hand over to the target inter-RAT cell determined by the processor, and the handover command carries an identifier of the target inter-RAT cell and information about the configured resource.

The RAN server is configured to manage the serving cell and the target inter-RAT cell of the terminal, and a communication RAT used by the serving cell is different from a communication RAT used by the target inter-RAT cell.

With reference to the seventh aspect, in a first possible implementation of the seventh aspect, the transmitter is further configured to:

send the information about the configured resource to an access point to which the target inter-RAT cell belongs, so that the access point performs resource configuration based on the information about the configured resource.

With reference to any possible implementation of the seventh aspect, in a second possible implementation of the seventh aspect, the transmitter is further configured to:

send a RAT indication message to a core network device, where the RAT indication message carries an identifier of the terminal and RAT information of the target inter-RAT cell, and the RAT information is used to indicate the communication RAT used by the target inter-RAT cell.

According to an eighth aspect, a first access network device is provided. The first access network device includes a transmitter, a receiver, and a processor connected to both the transmitter and the receiver, where the receiver is configured to receive a measurement report sent by a terminal, where the measurement report includes an identifier of a neighboring inter-RAT cell of a serving cell in which the terminal is located and a measured value of the neighboring inter-RAT cell;

the processor is configured to determine a target inter-RAT cell of the terminal based on the measurement report received by the receiver;

the transmitter is configured to send a handover request message to a second access network device through a communications interface between the first access network device and the second access network device to which the target inter-RAT cell determined by the processor belongs, where the handover request message is used to request the second access network device to configure a resource for the terminal in the target inter-RAT cell, the handover request message carries an identifier of the terminal and an identifier of the target inter-RAT cell, and the configured resource is a resource to be used by the terminal to access the target inter-RAT cell;

the receiver is further configured to receive, through the communications interface, a handover response message sent by the second access network device, where the handover response message carries information about the configured resource; and the transmitter is further configured to send a handover command to the terminal, where the handover command is used to instruct the terminal to hand over to the target inter-RAT cell, and the handover command carries the identifier of the target inter-RAT cell and the information about the configured resource that is received by the receiver.

A communication RAT used by the serving cell is different from a communication RAT used by the target inter-RAT cell.

With reference to the eighth aspect, in a first possible implementation of the eighth aspect, both the first access network device and the second access network device are radio access network RAN servers; or both the first access network device and the second access network device are base stations.

With reference to any possible implementation of the eighth aspect, in a second possible implementation of the eighth aspect, the transmitter is further configured to:

send a sequence number state transition message to the second access network device, where the sequence number state transition message carries at least one of a sequence number of a data packet not successfully sent to the terminal and a sequence number of a data packet lost in a transmission process, the sequence number of the data packet not successfully sent to the terminal is used by the second access network device to resend a data packet corresponding to the sequence number of the data packet not successfully sent to the terminal, and the sequence number of the data packet lost in the transmission process is used by the second access network device to request the terminal to resend a data packet corresponding to the sequence number of the data packet lost in the transmission process.

With reference to any one of the foregoing possible implementations of the eighth aspect, in a third possible implementation of the eighth aspect, the receiver is further configured to:

receive, when a communication connection between the first access network device and the second access network device is established, a device identifier of the second access network device, and cell identifiers and communication RAT information of all cells managed by the second access network device that are sent by the second access network device.

According to a ninth aspect, a second access network device is provided. The second access network device includes a transmitter, a receiver, and a processor connected to both the transmitter and the receiver, where the receiver is configured to receive a handover request message sent by a first access network device, where the handover request message carries an identifier of a terminal and an identifier of a target inter-RAT cell, and the first access network device is an access network device to which a serving cell in which the terminal is located belongs;

the processor is configured to configure a resource for the terminal in the target inter-RAT cell based on the handover request message received by the receiver; and the transmitter is configured to send a handover response message to the first access network device, where the handover response message carries information about the resource configured by the processor.

A communication RAT used by the serving cell is different from a communication RAT used by the target inter-RAT cell.

With reference to the ninth aspect, in a first possible implementation of the ninth aspect, both the first access network device and the second access network device are radio access network RAN servers; or both the first access network device and the second access network device are base stations.

With reference to any possible implementation of the ninth aspect, in a second possible implementation of the ninth aspect, the transmitter is further configured to send a path switching request message to a core network device, where the path switching request message carries RAT information of the target inter-RAT cell, and the RAT information is used to indicate the communication RAT used by the target inter-RAT cell; and the receiver is further configured to receive a path switching response message sent by the core network device, where the path switching response message carries data channel information, and the data channel information is used to indicate a channel for transmitting data between the core network device and the terminal.

With reference to any one of the foregoing possible implementations of the ninth aspect, in a third possible implementation of the ninth aspect, the transmitter is further configured to:

send the information about the configured resource to a target access point to which the target inter-RAT cell belongs, so that the target access point performs resource configuration based on the information about the configured resource.

With reference to any one of the foregoing possible implementations of the ninth aspect, in a fourth possible implementation of the ninth aspect, the receiver is further configured to receive a sequence number state transition message sent by the first access network device, where the sequence number state transition message carries at least one of a sequence number of a data packet not successfully sent to the terminal and a sequence number of a data packet lost in a transmission process; and the transmitter is further configured to: when the sequence number state transition message received by the receiver carries the sequence number of the data packet not successfully sent to the terminal, resend a data packet corresponding to the sequence number of the data packet not successfully sent to the terminal; and/or the transmitter is further configured to: when the sequence number state transition message received by the receiver carries the sequence number of the data packet lost in the transmission process, send a retransmission request message, where the retransmission request message is used to request the terminal to resend a data packet corresponding to the sequence number of the data packet lost in the transmission process.

With reference to any one of the foregoing possible implementations of the ninth aspect, in a fifth possible implementation of the ninth aspect, the transmitter is further configured to:

send, when a communication connection between the first access network device and the second access network device is established, a device identifier of the second access network device, and cell identifiers and communication RAT information of all cells managed by the second access network device to the first access network device.

Beneficial effects brought by the technical solutions provided in the embodiments of the present application are: In the process of the handover between the inter-RAT cells, the RAN server determines the target inter-RAT cell of the terminal based on the measurement report reported by the terminal, to be specific, determines the neighboring inter-RAT cell that the terminal prepares to access. Then, the RAN server configures the resource for the terminal in the target inter-RAT cell, and sends the information about the configured resource and the identifier of the target inter-RAT cell to the terminal, so that the terminal is handed over to the target inter-RAT cell. No core network needs to be crossed in the process of the handover between the inter-RAT cells, thereby reducing signaling exchange between the source core network and the target core network.

BRIEF DESCRIPTION OF DRAWINGS

To describe the technical solutions in the embodiments of the present application more clearly, the following briefly describes the accompanying drawings required for describing the embodiments. Apparently, the accompanying drawings in the following description show merely some embodiments of the present application, and a person of ordinary skill in the art may still derive other drawings from these accompanying drawings without creative efforts.

FIG. 1C is a flowchart of a method for handover between inter-RAT cells according to an example of an embodiment;

FIG. 2 is a flowchart of a method for handover between inter-RAT cells according to an example of another embodiment;

FIG. 5A-1 and FIG. 5A-2 are a flowchart of a method for handover between inter-RAT cells according to an example of another embodiment;

DESCRIPTION OF EMBODIMENTS

To make the objectives, technical solutions, and advantages of the present application clearer, the following further describes the implementations of the present application in detail with reference to the accompanying drawings.

Figure 1A:
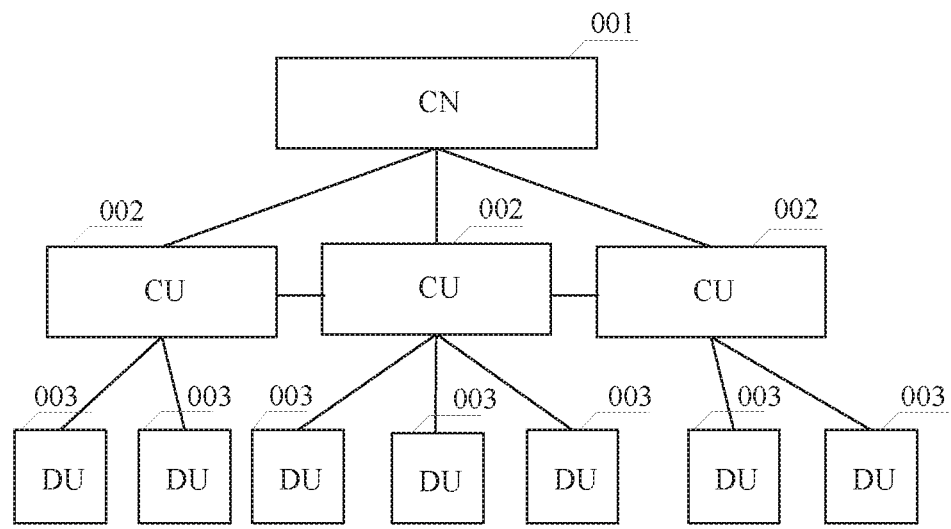
FIG. 1A is a schematic diagram of a network architecture according to an example of an embodiment.

FIG. 1A is a schematic diagram of a network architecture according to an example of an embodiment. The network architecture mainly includes a core network (CN) 001, at least one central unit (CU) 002, and at least one distributed unit (DU) 003. The core network 001 is connected to the at least one CU 002, each of the at least one CU 002 is connected to the at least one DU 003, and a communications interface exists between CUs 002. The CU 002 may provide a higher-layer protocol stack, and the DU 003 may provide a lower-layer protocol stack. Using a Long Term Evolution (LTE) protocol as an example, the CU 002 may include a Radio Resource Control (RRC) layer and a Packet Data Convergence Protocol (PDCP) layer. Correspondingly, the DU 003 may include a Radio Link Control (RLC) layer, a Media Access Control (MAC) layer, and a physical layer. In a possible implementation, protocol layer division between the CU 002 and the DU 003 may be performed in another manner. This is not limited in this embodiment of the present application. In addition, the at least one DU 003 may be an access point of at least one RAT. A method for handover between inter-RAT cells in the embodiments of the present application may be implemented based on the network architecture.

Figure 1B:
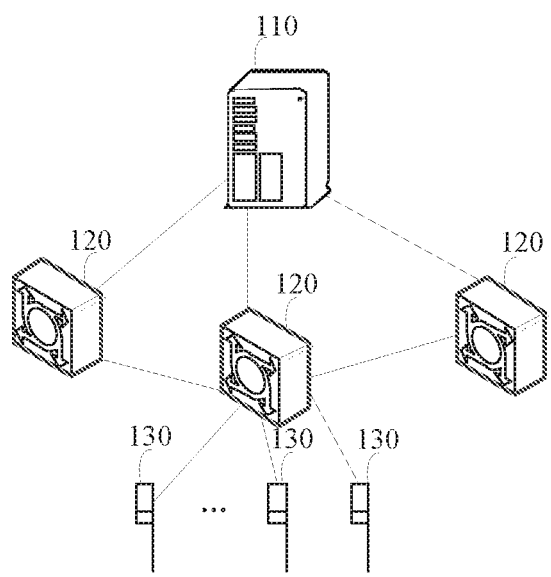
FIG. 1B is a schematic diagram of an implementation environment according to the embodiment of FIG. 1A.

FIG. 1B is a schematic diagram of an implementation environment according to the embodiment of FIG. 1A. The implementation environment includes a core network device 110, at least one radio access network (RAN) server 120, and an access point 130 of at least one RAT. The core network device 110 is connected to the at least one RAN server 120 separately. That is, the core network device 110 is configured to manage the at least one RAN server 120.

A communications interface exists between the at least one RAN server 120, and each of the at least one RAN server 120 is connected to the access point 130 of the at least one RAT. That is, an access point of one RAT may be deployed for each of the at least one RAN server 120. For example, the access point of the RAT may include only a new radio access technology (NR) site. In this case, the RAN server 120 and the NR site are equivalent to an NR base station. Certainly, a plurality of inter-RAT access points may alternatively be deployed for the RAN server 120, and the plurality of inter-RAT access points use different communication RATs. For example, the plurality of inter-RAT access points may include an LTE site, an NR site, a wireless fidelity access point (WiFi AP), and the like. The terminal may access a cell in a network by using the access point. As a new radio access technology and compared with LTE, NR can provide a shorter delay and a larger bandwidth and support a large quantity of connections, to satisfy a growing requirement for mobile communications.

It should be noted that in this embodiment of the present application, the example of the implementation environment shown in FIG. 1B may be considered as a special case in the network architecture shown in FIG. 1A. In other words, in FIG. 1A, the CN 001 is equivalent to the core network device 110 in FIG. 1B, the CU 002 is equivalent to the RAN server 120 in FIG. 1B, and the DU 003 in FIG. 1A is equivalent to the access point 130 of one RAT in the FIG. 1B.

In addition, it should further be noted that in an actual implementation process, the terminal needs to interact with the RAN server 120 by using the access point. That is, the terminal first sends communication data to the access point, and the access point then forwards the communication data to the RAN server 120. Similarly, the RAN server 120 also needs to interact with the terminal by using the access point. In the embodiments of the present application, descriptions of the process are omitted. That is, the embodiments are described in a manner in which the terminal directly interacts with the RAN server 120.

FIG. 1C is a flowchart of a method for handover between inter-RAT cells according to an example of an embodiment. The method for handover between inter-RAT cells may include the following several steps.

Step 101. A radio access network RAN server receives a measurement report sent by a terminal, where the measurement report includes an identifier of a neighboring inter-RAT cell of a serving cell in which the terminal is located and a measured value of the neighboring inter-RAT cell.

Step 102. The RAN server determines a target inter-RAT cell of the terminal based on the measurement report, and configures a resource for the terminal in the target inter-RAT cell, where the configured resource is a resource to be used by the terminal to access the target inter-RAT cell.

Step 103. The RAN server sends a handover command to the terminal, where the handover command is used to instruct the terminal to hand over to the target inter-RAT cell, the handover command carries an identifier of the target inter-RAT cell and information about the configured resource, the RAN server is configured to manage the serving cell and the target inter-RAT cell of the terminal, and a communication RAT used by the serving cell is different from a communication RAT used by the target inter-RAT cell.

In this embodiment of the present application, in a process of handover between inter-RAT cells, the RAN server determines the target inter-RAT cell of the terminal based on the measurement report reported by the terminal, to be specific, determines the neighboring inter-RAT cell that the terminal prepares to access. Then, the RAN server configures the resource for the terminal in the target inter-RAT cell, and sends the information about the configured resource and the identifier of the target inter-RAT cell to the terminal, so that the terminal is handed over to the target inter-RAT cell. No core network needs to be crossed in the process of the handover between the inter-RAT cells, thereby reducing signaling exchange between a source core network and a target core network.

Optionally, before the sending, by the RAN server, a handover command to the terminal, the method further includes:

sending the information about the configured resource to an access point to which the target inter-RAT cell belongs, so that the access point performs resource configuration based on the information about the configured resource.

Optionally, after the sending, by the RAN server, a handover command to the terminal, the method further includes:

sending a RAT indication message to a core network device, where the RAT indication message carries an identifier of the terminal and RAT information of the target inter-RAT cell, and the RAT information is used to indicate the communication RAT used by the target inter-RAT cell.

All the foregoing optional technical solutions may be randomly combined to form optional embodiments of the present application. This is not described exhaustively in this embodiment of the present application.

Figures 1, 5A:
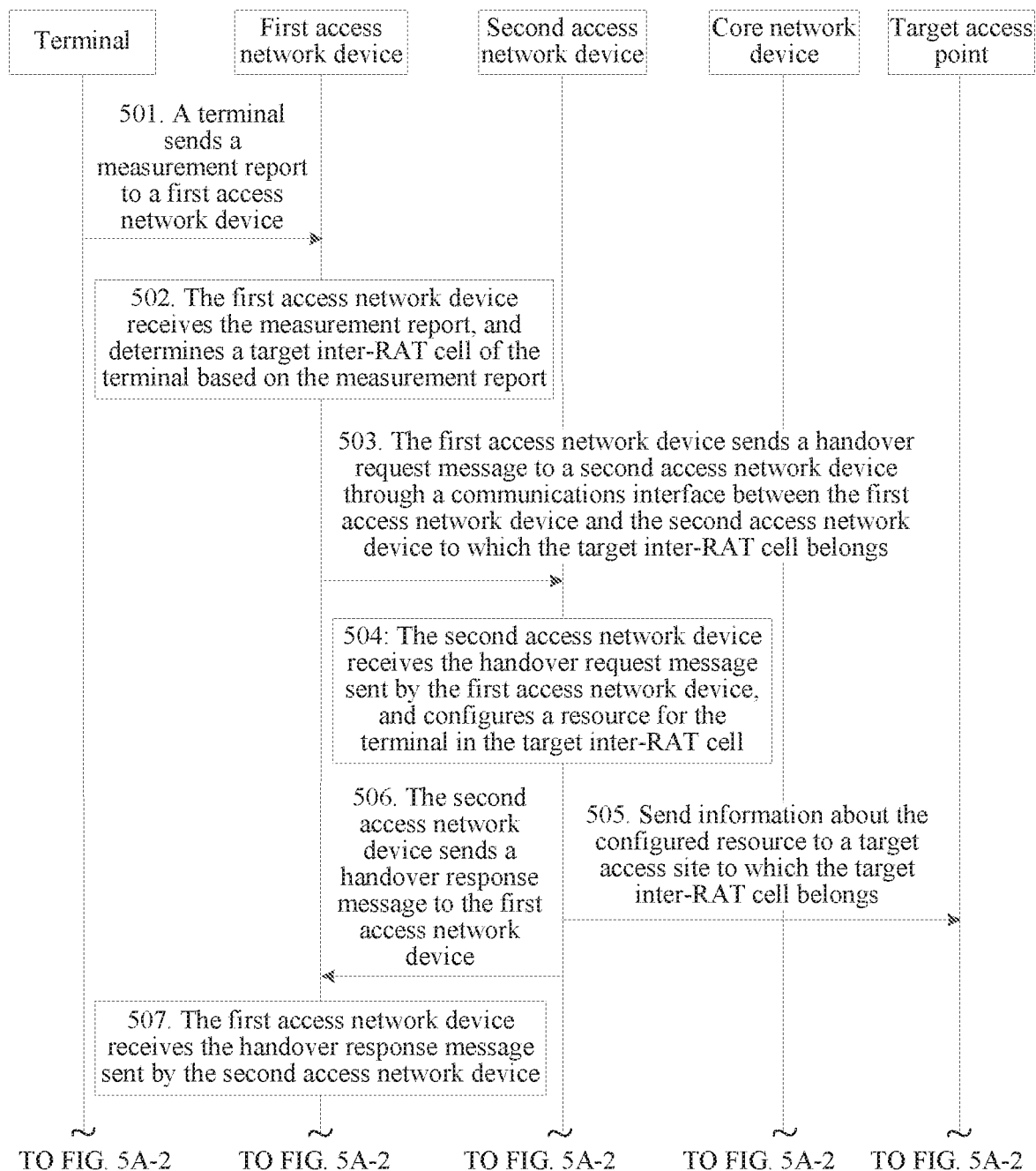
Figures 2, 5A:
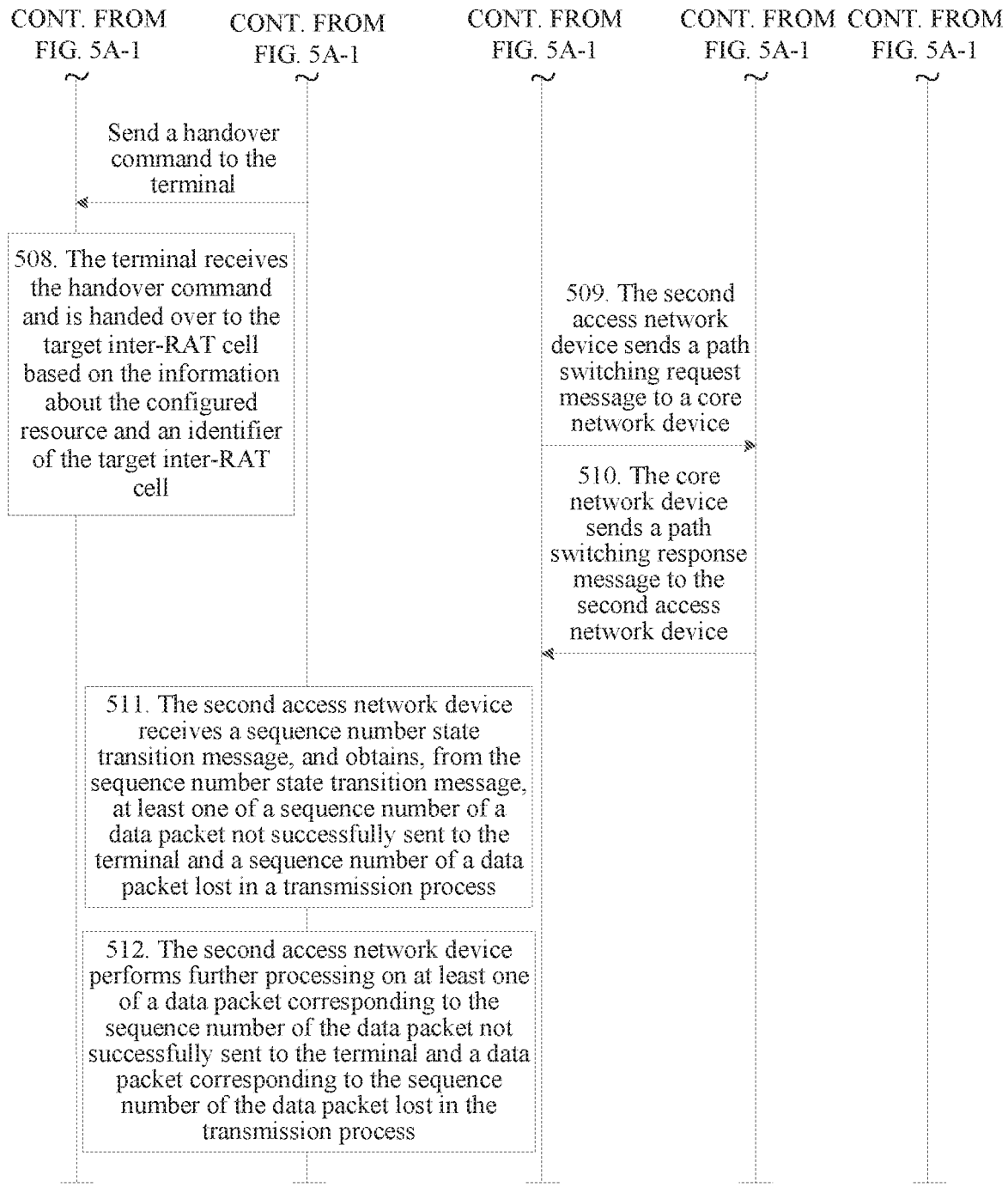

FIG. 2 is a flowchart of a method for handover between inter-RAT cells according to an example of another embodiment. The method for handover between inter-RAT cells may include the following several steps.

Step 201. A first access network device receives a measurement report sent by a terminal, where the measurement report includes an identifier of a neighboring inter-RAT cell of a serving cell in which the terminal is located and a measured value of the neighboring inter-RAT cell.

Step 202. The first access network device determines a target inter-RAT cell of the terminal based on the measurement report.

Step 203. The first access network device sends a handover request message to a second access network device through a communications interface between the first access network device and the second access network device to which the target inter-RAT cell belongs, where the handover request message is used to request the second access network device to configure a resource for the terminal in the target inter-RAT cell, the handover request message carries an identifier of the terminal and an identifier of the target inter-RAT cell, and the configured resource is a resource to be used by the terminal to access the target inter-RAT cell.

Step 204. The first access network device receives, through the communications interface, a handover response message sent by the second access network device, where the handover response message carries information about the configured resource.

Step 205. The first access network device sends a handover command to the terminal, where the handover command is used to instruct the terminal to hand over to the target inter-RAT cell, the handover command carries the identifier of the target inter-RAT cell and the information about the configured resource, and a communication RAT used by the serving cell is different from a communication RAT used by the target inter-RAT cell.

In this embodiment of the present application, after the first access network device determines the target inter-RAT cell of the terminal based on the measurement report, when an access point to which the target inter-RAT cell belongs does not belong to the first access network device, the first access network device sends the handover request message to the second access network device through the communications interface between the first access network device and the second access network device to which the target inter- RAT cell belongs, so that the second access network device configures the resource for the terminal in the target inter-RAT cell, and returns the information about the configured resource to the first access network device. Then, the first access network device sends the information about the configured resource and the identifier of the target inter-RAT cell to the terminal, so that the terminal is handed over to the target inter-RAT cell. No core network needs to be crossed in a process of handover between inter-RAT cells, thereby reducing signaling exchange between a source core network and a target core network.

Optionally, both the first access network device and the second access network device are radio access network RAN servers; or both the first access network device and the second access network device are base stations.

Optionally, after the sending, by the first access network device, a handover command to the terminal, the method further includes:

sending, by the first access network device, a sequence number state transition message to the second access network device, where the sequence number state transition message carries at least one of a sequence number of a data packet not successfully sent to the terminal and a sequence number of a data packet lost in a transmission process, the sequence number of the data packet not successfully sent to the terminal is used by the second access network device to resend a data packet corresponding to the sequence number of the data packet not successfully sent to the terminal, and the sequence number of the data packet lost in the transmission process is used by the second access network device to request the terminal to resend a data packet corresponding to the sequence number of the data packet lost in the transmission process.

Optionally, before the receiving, by a first access network device, a measurement report sent by a terminal, the method further includes:

receiving, when a communication connection between the first access network device and the second access network device is established, a device identifier of the second access network device, and cell identifiers and communication RAT information of all cells managed by the second access network device that are sent by the second access network device.

All the foregoing optional technical solutions may be randomly combined to form optional embodiments of the present application. This is not described exhaustively in this embodiment of the present application.

Figure 3:
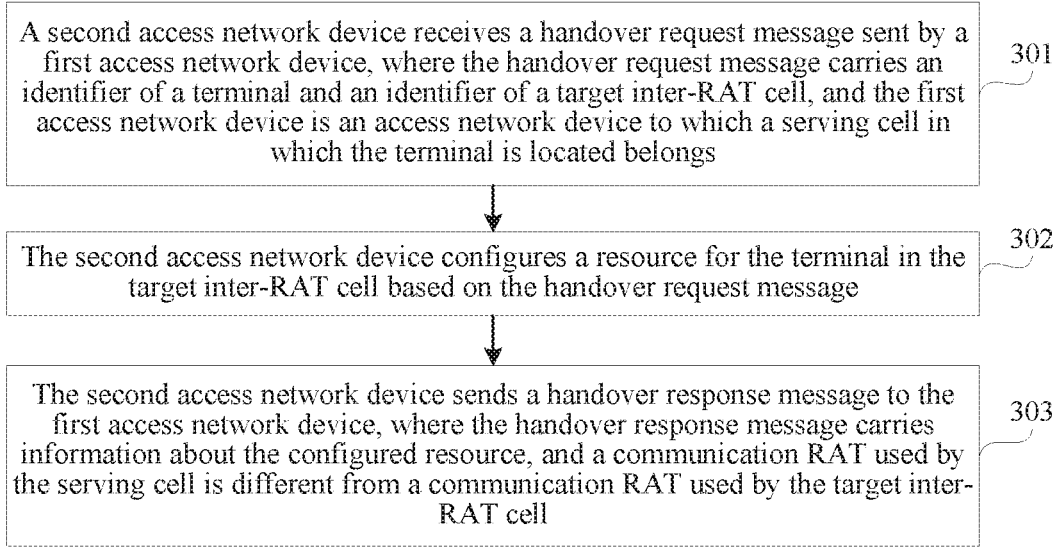
FIG. 3 is a flowchart of a method for handover between inter-RAT cells according to an example of another embodiment.

FIG. 3 is a flowchart of a method for handover between inter-RAT cells according to an example of another embodiment. The method for handover between inter-RAT cells may include the following several steps.

Step 301. A second access network device receives a handover request message sent by a first access network device, where the handover request message carries an identifier of a terminal and an identifier of a target inter-RAT cell, and the first access network device is an access network device to which a serving cell in which the terminal is located belongs.

Step 302. The second access network device configures a resource for the terminal in the target inter-RAT cell based on the handover request message.

Step 303. The second access network device sends a handover response message to the first access network device, where the handover response message carries information about the configured resource, and a communication RAT used by the serving cell is different from a communication RAT used by the target inter-RAT cell.

In this embodiment of the present application, in a process of handover between inter-RAT cells, when the access point to which the target inter-RAT cell belongs does not belong to the first access network device, the first access network device sends the handover request message to the second access network device to which the target inter-RAT cell belongs. Correspondingly, after receiving the handover request message, the second access network device configures the resource for the terminal in the target inter-RAT cell based on the identifier of the terminal and the identifier of the target inter-RAT cell that are carried in the handover request message, and sends the information about the configured resource to the first access network device. The first access network device sends the information about the configured resource and the identifier of the target inter-RAT cell to the terminal, so that the terminal is handed over to the target inter-RAT cell. No core network needs to be crossed in the process of the handover between the inter-RAT cells, thereby reducing signaling exchange between a source core network and a target core network.

Optionally, both the first access network device and the second access network device are radio access network RAN servers; or both the first access network device and the second access network device are base stations.

Optionally, after the sending, by the second access network device, a handover response message to the first access network device, the method further includes:

sending, by the second access network device, a path switching request message to a core network device, where the path switching request message carries RAT information of the target inter-RAT cell, and the RAT information is used to indicate the communication RAT used by the target inter-RAT cell; and receiving, by the second access network device, a path switching response message sent by the core network device, where the path switching response message carries data channel information, and the data channel information is used to indicate a channel for transmitting data between the core network device and the terminal.

Optionally, before the sending, by the second access network device, a handover response message to the first access network device, the method further includes:

sending, by the second access network device, the information about the configured resource to a target access point to which the target inter-RAT cell belongs, so that the target access point performs resource configuration based on the information about the configured resource.

Optionally, after the receiving a path switching response message sent by the core network device, the method further includes:

receiving, by the second access network device, a sequence number state transition message sent by the first access network device, where the sequence number state transition message carries at least one of a sequence number of a data packet not successfully sent to the terminal and a sequence number of a data packet lost in a transmission process; and if the sequence number state transition message carries the sequence number of the data packet not successfully sent to the terminal, resending, by the second access network device, a data packet corresponding to the sequence number of the data packet not successfully sent to the terminal; and/or if the sequence number state transition message carries the sequence number of the data packet lost in the transmission process, sending, by the second access network device, a retransmission request message, where the retransmission request message is used to request the terminal to resend a data packet corresponding to the sequence number of the data packet lost in the transmission process.

Optionally, before the receiving, by a second access network device, a handover request message sent by a first access network device, the method further includes:

sending, when a communication connection between the first access network device and the second access network device is established, a device identifier of the second access network device, and cell identifiers and communication RAT information of all cells managed by the second access network device to the first access network device.

All the foregoing optional technical solutions may be randomly combined to form optional embodiments of the present application. This is not described exhaustively in this embodiment of the present application.

Figure 4:
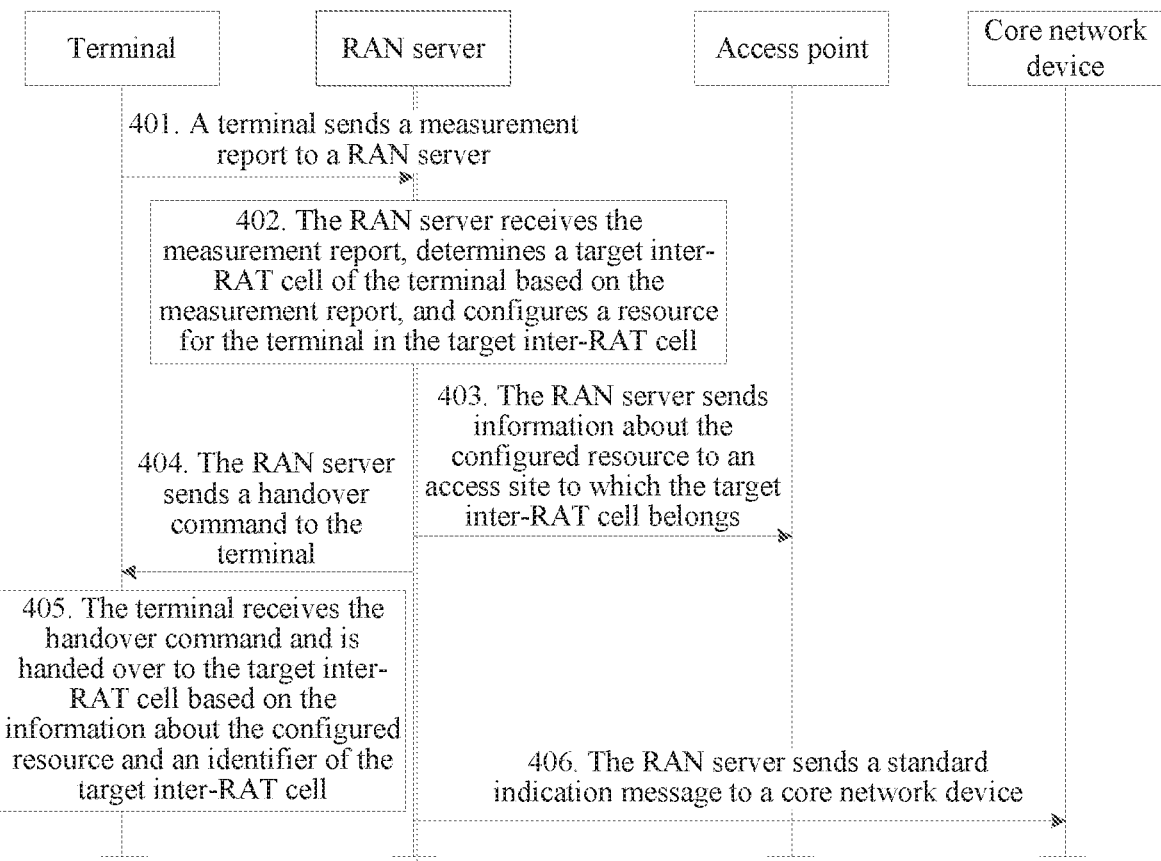
FIG. 4 is a flowchart of a method for handover between inter-RAT cells according to an example of another embodiment.

FIG. 4 is a flowchart of a method for handover between inter-RAT cells according to an example of another embodiment. This embodiment is described by using an example in which the method for handover between inter-RAT cells is implemented in a multi-party interaction manner. The method for handover between inter-RAT cells may include the following several steps.

Step 401. A terminal sends a measurement report to a RAN server, where the measurement report includes an identifier of a neighboring inter-RAT cell of a serving cell in which the terminal is located and a measured value of the neighboring inter-RAT cell.

In an actual application process, because various inter-RAT networks have wide coverage, in a process in which the terminal accesses a network, it is very possible that the terminal moves from a cell of one RAT to a cell of another RAT. In this case, to avoid affecting normal running of a communications service of the terminal, the terminal needs to hand over between the inter-RAT cells. Referring to FIG. 1B, in this embodiment of the present application, descriptions are provided by using an example in which an access point to which the target inter-RAT cell belongs belongs to the RAN server. That is, the RAN server is configured to manage both the serving cell and the target inter-RAT cell of the terminal, and a communication RAT used by the serving cell is different from a communication RAT used by the target inter-RAT cell.

To determine whether the terminal moves to the neighboring inter-RAT cell, that is, to determine whether the terminal needs to hand over, the terminal sends the measurement report to the RAN server every preset duration or when the terminal detects that a measured event is satisfied, for example, when the terminal detects that the measured value of the neighboring inter-RAT cell is greater than a preset threshold. The measurement report includes the identifier of the neighboring inter-RAT cell of the serving cell in which the terminal is located and the measured value of the neighboring inter-RAT cell. In this way, the RAN server can determine, based on the measurement report, a neighboring inter-RAT cell to which the terminal needs to hand over. The identifier of the neighboring inter-RAT cell is used to uniquely identify one neighboring inter-RAT cell, and the measured value of the neighboring inter-RAT cell is usually a measured value of a reference signal. Identifiers of all neighboring inter-RAT cells are in a one-to-one correspondence with measured values of the neighboring inter-RAT cells.

The preset duration may be user-defined by a user according to an actual requirement or may be set by the terminal by default. This is not limited in this embodiment of the present application.

The preset threshold may be user-defined by a user according to an actual requirement or may be set by the terminal by default. This is not limited in this embodiment of the present application.

The measurement report may be obtained by the terminal through measurement, or may be sent by another device having a connection relationship with the terminal to the terminal after measurement. This is not limited in this embodiment of the present application. For a specific implementation of obtaining the measurement report, refer to the prior art. This is not described in detail herein.

It should be noted that in this embodiment of the present application, descriptions are provided only by using an example of implementing the handover between the inter-RAT cells. In another embodiment, the handover method in this embodiment of the present application can also be applicable to implementation of handover between cells of a same RAT. The handover between the cells of the same RAT is not described in detail in this embodiment of the present application.

Step 402. The RAN server receives the measurement report, determines a target inter-RAT cell based on the measurement report, and configures a resource for the terminal in the target inter-RAT cell, where the configured resource is a resource to be used by the terminal to access the target inter-RAT cell.

In a possible implementation, a specific implementation of receiving, by the RAN server, the measurement report and determining the target inter-RAT cell based on the measurement report may include: obtaining a largest measured value of a neighboring inter-RAT cell from the measured values of the neighboring inter-RAT cells, and determining a cell corresponding to the largest measured value of the neighboring inter-RAT cell as the target inter-RAT cell.

It should be noted that this embodiment is described only by using an example in which the largest measured value of the neighboring inter-RAT cell is obtained from the measured values of the neighboring inter-RAT cells, and the cell corresponding to the largest measured value of the neighboring inter-RAT cell is determined as the target inter-RAT cell. In another embodiment, the target inter-RAT cell may alternatively be determined in another manner. This is not limited in this embodiment of the present application.

The RAN server is connected to a plurality of inter-RAT access points, and as described above, the RAN server is configured to manage the plurality of inter-RAT access points. Therefore, after determining the target inter-RAT cell, the RAN server directly configures the resource for the terminal in the target inter-RAT cell.

Step 403. The RAN server sends information about the configured resource to an access point to which the target inter-RAT cell belongs, so that the access point performs resource configuration based on the information about the configured resource.

During handover implementation, before the terminal accesses the target inter-RAT cell, the access point to which the target inter-RAT cell belongs needs to prepare to receive access of the terminal. Therefore, after configuring the resource for the terminal in the target inter-RAT cell, the RAN server needs to send the information about the configured resource to the access point to which the target inter-RAT cell belongs, so that the access point performs resource configuration based on the information about the configured resource, to wait for access of the terminal. For example, the access point to which the target inter-RAT cell belongs performs, based on the information about the configured resource, resource configuration on a Radio Link Control (RLC) protocol layer, a Media Access Control (MAC) layer, and a physical layer (Physical Layer, PHY) of the access point.

Step 404. The RAN server sends a handover command to the terminal, where the handover command carries at least an identifier of the target inter-RAT cell and the information about the configured resource.

After sending the information about the configured resource to the access point to which the target inter-RAT cell belongs, the RAN server needs to send the information about the configured resource to the terminal, and also needs to instruct the terminal to perform handover. That is, the RAN server sends the handover command to the terminal. In a possible implementation, the handover command may be sent to the terminal by using a RRC protocol message. In addition, to enable the terminal to learn of a neighboring inter-RAT cell to which the terminal needs to hand over, the handover command also carries the identifier of the target inter-RAT cell and the information about the configured resource.

Step 405. The terminal receives the handover command and is handed over to the target inter-RAT cell based on the information about the configured resource and the identifier of the target inter-RAT cell.

After receiving the handover command, the terminal extracts the information about the configured resource and the identifier of the target inter-RAT cell from the handover command. The terminal performs information configuration based on the information about the configured resource, and synchronizes, based on the identifier of the target inter-RAT cell, with the access point to which the target inter-RAT cell belongs. For a specific implementation of performing, by the terminal, information configuration based on the information about the configured resource, and synchronizing, based on the identifier of the target inter-RAT cell, with the access point to which the target inter-RAT cell belongs, refer to the prior art, for example, refer to a random access process in LTE in the prior art. This is not limited in this embodiment of the present application.

In a possible implementation, after being handed over to the target inter-RAT cell, the terminal sends an information configuration completion message to the RAN server by using the target inter-RAT cell. The information configuration completion message is used to indicate that the terminal has completed the information configuration, that is, the terminal has accessed the target inter-RAT cell.

In this way, the handover between the inter-RAT cells is implemented in this embodiment. In addition, after the terminal is handed over to the target inter-RAT cell, all of a charging policy, a security mechanism, and the like of a core network device for the terminal change. Therefore, in this embodiment of the present application, after the handover is completed, the core network device further needs to be notified that the terminal has accessed the neighboring inter-RAT cell. For details, refer to step 406.

Step 406. The RAN server sends a RAT indication message to a core network device, where the RAT indication message carries an identifier of the terminal and RAT information of the target inter-RAT cell, and the RAT information is used to indicate a communication RAT used by the target inter-RAT cell.

After receiving the information configuration completion message, the RAN server sends the RAT indication message to the core network device, to notify the core network device of the RAT information of the target inter-RAT cell that the terminal has accessed, so that the RAN server and the core network device perform a further operation based on the RAT information, for example, change the charging policy, the security mechanism, or the like for the terminal.

In addition, in a possible implementation, after receiving the RAT indication message sent by the RAN server, the core network device may send a RAT indication acknowledgment message to the RAN server. The RAT indication acknowledgment message is used to indicate that the core network device has received the RAT indication message, to prevent the RAN server from repeatedly sending the RAT indication message.

In this embodiment of the present application, in a process of the handover between the inter-RAT cells, the RAN server determines the target inter-RAT cell of the terminal based on the measurement report reported by the terminal, to be specific, determines the neighboring inter-RAT cell that the terminal prepares to access. Then, the RAN server configures the resource for the terminal in the target inter-RAT cell, and sends the information about the configured resource and the identifier of the target inter-RAT cell to the terminal, so that the terminal is handed over to the target inter-RAT cell. No core network needs to be crossed in the process of the handover between the inter-RAT cells, thereby reducing signaling exchange between a source core network and a target core network.

FIG. 5A-1 and FIG. 5A-2 are a flowchart of a method for handover between inter-RAT cells according to an example of another embodiment. This embodiment is described by using an example in which the method for handover between inter-RAT cells is implemented in a multi-party interaction manner. The method for handover between inter-RAT cells may include the following several steps.

Step 501. A terminal sends a measurement report to a first access network device, where the measurement report includes an identifier of a neighboring inter-RAT cell of a serving cell in which the terminal is located and a measured value of the neighboring inter-RAT cell.

In this embodiment of the present application, descriptions are provided by using an example in which an access point to which a target inter-RAT cell belongs does not belong to the first access network device. That is, not both an access point to which the serving cell of the terminal belongs and the access point to which the target inter-RAT cell belongs belong to the first access network device. The access point to which the target inter-RAT cell belongs belongs to a second access network device. A communications interface exists between the first access network device and the second access network device, and the first access network device and the second access network device belong to a same core network device. That is, the core network device is configured to manage the serving cell and the target inter-RAT cell of the terminal, and a communication RAT used by the serving cell is different from a communication RAT used by the target inter-RAT cell.

Both the first access network device and the second access network device may be RAN servers, or both the first access network device and the second access network device may be base stations.

Figure 5B:
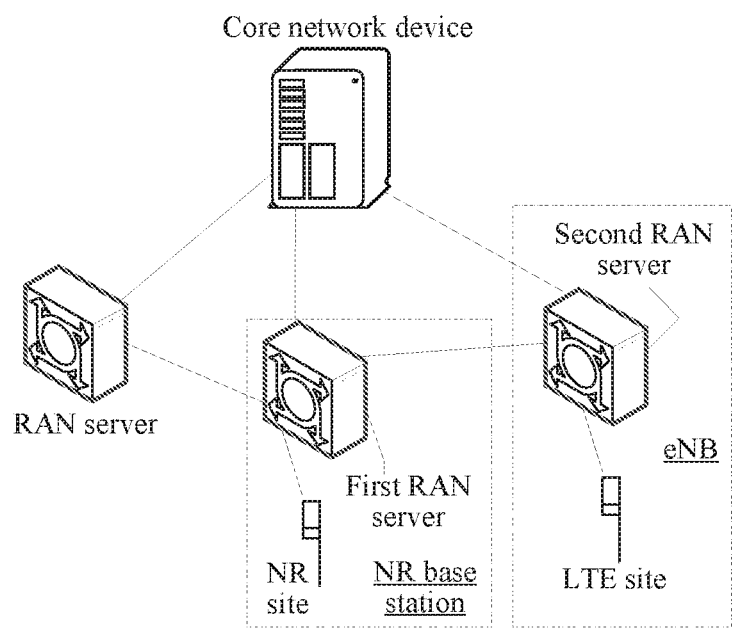
FIG. 5B is a schematic diagram of an implementation environment according to the embodiment of FIG. 5A-1 and FIG. 5A-2.

When both the first access network device and the second access network device are RAN servers, refer to FIG. 1B, and handover between inter-RAT cells in this embodiment of the present application means that the terminal is handed over from a serving cell managed by one RAN server to an inter-RAT cell managed by another RAN server. When both the first access network device and the second access network device are base stations, refer to FIG. 5B, and handover between inter-RAT cells in this embodiment of the present application means that the terminal is handed over from a serving cell of one base station to an inter-RAT cell of another base station. Handover principles in the foregoing two cases are similar.

For a specific implementation process of sending, by the terminal, the measurement report to the first access network device, refer to the implementation process of sending, by the terminal, the measurement report to the RAN server in step 401, and details are not described herein again.

It should be noted that in this embodiment of the present application, descriptions are provided only by using an example of implementing the handover between the inter-RAT cells. In another embodiment, the handover method in this embodiment of the present application can also be applicable to implementation of handover between cells of a same RAT. The handover between the cells of the same RAT is not described in detail in this embodiment of the present application.

Step 502. The first access network device receives the measurement report, and determines a target inter-RAT cell based on the measurement report.

For a specific implementation process of determining, by the first access network device, the target inter-RAT cell based on the measurement report, refer to the implementation process of determining, by the RAN server, the target inter-RAT cell based on the measurement report in step 402, and details are not described herein again.

Herein, it should be noted that to enable the first access network device to determine, based on the identifier of the target inter-RAT cell, the second access network device to which the target inter-RAT cell belongs, when the first access network device establishes a communication connection to the second access network device, the first access network device and the second access network device may exchange information about cells managed by the first access network device and the second access network device.

Specifically, when the communication connection between the first access network device and the second access network device is established, the first access network device receives a device identifier of the second access network device, and identifiers and communication RAT information of all cells managed by the second access network device that are sent by the second access network device.

The device identifier is used to uniquely identify one access network device, and the communication RAT information is used to uniquely describe a communication RAT of one cell.

Step 503. The first access network device sends a handover request message to a second access network device through a communications interface between the first access network device and the second access network device to which the target inter-RAT cell belongs, where the handover request message is used to request the second access network device to configure a resource for the terminal in the target inter-RAT cell, the handover request message carries an identifier of the terminal and an identifier of the target inter-RAT cell, and the configured resource is a resource to be used by the terminal to access the target inter-RAT cell.

The first access network device sends the handover request message to the second access network device through the communications interface between the first access network device and the second access network device to which the target inter-RAT cell belongs. As can be learned, the communications interface exists between the first access network device and the second access network device. Therefore, it can indicate that the first access network device and the second access network device belong to a same core network. That is, the core network device may be configured to manage the first access network device and the second access network device.

The first access network device sends the handover request message to the second access network device, so that the second access network device configures the handover-required resource for the terminal in the target inter-RAT cell based on the identifier of the terminal and the identifier of the target inter-RAT cell.

Step 504: The second access network device receives the handover request message sent by the first access network device, and configures the resource for the terminal in the target inter-RAT cell based on the handover request message, where the handover request message carries the identifier of the terminal and the identifier of the target inter-RAT cell, and the first access network device is an access network device to which a serving cell in which the terminal is located belongs.

After receiving the handover request message sent by the first access network device, the second access network device may determine, based on a current use status of the target inter-RAT cell, whether to accept the handover request message. If the second access network device accepts the handover request message, the second access network device configures the resource for the terminal in the target inter-RAT cell. If the second access network device does not accept the handover request message, the second access network device sends a handover failure response message to the first access network device. When the second access network device does not accept the handover request message, the first access network device needs to determine another target inter-RAT cell based on the measurement report. A subsequent implementation process is similar to that in this embodiment of the present application, and the case is not described in detail herein again.

Step 505. The second access network device sends information about the configured resource to a target access point to which the target inter-RAT cell belongs, so that the target access point performs resource configuration based on the information about the configured resource.

In addition, for a principle of sending, by the second access network device, the information about the configured resource to the target access point, refer to the principle of sending, by the RAN server, the information about the configured resource to the access point to which the target inter-RAT cell belongs in step 403, and details are not described herein again.

Step 506. The second access network device sends a handover response message to the first access network device, where the handover response message carries the information about the configured resource.

After sending the information about the configured resource to the access point to which the target inter-RAT cell belongs, the second access network device further needs to send the information about the configured resource to the terminal by using the first access network device. To be specific, the second access network device sends, to the first access network device, the handover response message carrying the information about the configured resource.

Step 507. The first access network device receives the handover response message sent by the second access network device, and sends a handover command to the terminal, where the handover command carries the information about the configured resource and the identifier of the target inter-RAT cell.

For a specific implementation process of sending, by the first access network device, the handover command to the terminal after receiving the handover response message sent by the second access network device, refer to the implementation process of sending, by the RAN server, the handover command to the terminal in step 404, and details are not described herein again.

In addition, after sending the handover command to the terminal, the first access network device further sends a sequence number state transition message to the second access network device. The sequence number state transition message carries at least one of a sequence number of a data packet not successfully sent to the terminal and a sequence number of a data packet lost in a transmission process.

Because the terminal is to hand over to the second access network device, a service performed on the first access network device is terminated in the transmission process. In this case, to ensure data transmission reliability, the first access network device needs to notify the second access network device of a service running status of the terminal, that is, needs to notify the second access network device of the at least one of the sequence number of the data packet not successfully sent to the terminal and the sequence number of the data packet lost in the transmission process, so that after the terminal is successfully handed over to the target inter-RAT cell managed by the second access network device, the second access network device performs further processing on at least one of a data packet corresponding to the sequence number of the data packet not successfully sent to the terminal and a data packet corresponding to the sequence number of the data packet lost in the transmission process. For details, refer to the following step 511 and step 512.

Step 508. The terminal receives the handover command and is handed over to the target inter-RAT cell based on the information about the configured resource and the identifier of the target inter-RAT cell.

For a specific implementation process in which the terminal is handed over to the target inter-RAT cell based on the information about the configured resource and the identifier of the target inter-RAT cell, refer to step 405, and details are not described herein again.

Step 509. The second access network device sends a path switching request message to a core network device, where the path switching request message carries RAT information of the target inter-RAT cell, and the RAT information is used to indicate a communication RAT used by the target inter-RAT cell.

In this embodiment of the present application, the first access network device is replaced. To be specific, in the terminal handover process, a cell managed by the first access network device is changed to a cell managed by the second access network device. Therefore, a path for transmitting data between the terminal and the core network device also changes. To be specific, transmitting the data between the terminal and the core network device by using the first access network device changes to transmitting the data between the terminal and the core network device by using the second access network device. Therefore, after receiving an information configuration completion message sent by the terminal, the second access network device needs to send the path switching request message to the core network device, so that the core network device changes the path for transmitting data between the core network device and the terminal.

In addition, in a possible implementation, the path switching request message may further carry the RAT information of the target inter-RAT cell, so that the core network device determines that a further operation can be performed based on the RAT information of the target inter-RAT cell, for example, changing a charging policy, a security mechanism, or the like for the terminal.

Step 510. The core network device sends a path switching response message to the second access network device, where the path switching response message carries data channel information.

After receiving the path switching request message sent by the second access network device, the core network device establishes a data channel to the second access network device. That is, the foregoing data channel information is used to indicate a channel for transmitting the data between the core network device and the terminal. The core network device sends the data channel information corresponding to the data channel to the second access network device. In other words, the second access network device receives the path switching response message sent by the core network device.

In addition, after receiving the path switching response message sent by the core network device, the second access network device confirms that all data links of the terminal have been migrated to the second access network device. The second access network device may send a terminal context release message to the first access network device. The terminal context release message carries the identifier of the terminal, and the context release message is used to instruct the first access network device to release context of the terminal in the first access network device.

In a possible implementation, after receiving the path switching response message sent by the core network device, the second access network device starts timing, and then sends the terminal context release message to the first access network device after specified duration. In this way, when the terminal is frequently handed over between the cell before the handover and the inter-RAT cell after the handover, re-establishment of the context can be avoided, thereby reducing a handover delay in another form.

The specified duration may be user-defined by a user according to an actual requirement or may be set by the second access network device by default. This is not limited in this embodiment of the present application.

In this way, the handover between the inter-RAT cells is implemented. In addition, in this embodiment of the present application, as described in step 507, to ensure data transmission reliability, after sending the handover command to the terminal, the first access network device further sends the sequence number state transition message to the second access network device. Therefore, after handover of the terminal is completed, the second access network device further needs to perform further processing on the data packet corresponding to the sequence number of the data packet not successfully sent to the terminal and the data packet corresponding to the sequence number of the data packet lost in the transmission process that are in the sequence number state transition message. For a specific implementation process, refer to the following step 511 and step 512.

Step 511. The second access network device receives a sequence number state transition message, and obtains, from the sequence number state transition message, at least one of a sequence number of a data packet not successfully sent to the terminal and a sequence number of a data packet lost in a transmission process.

Step 512. The second access network device performs further processing on at least one of a data packet corresponding to the sequence number of the data packet not successfully sent to the terminal and a data packet corresponding to the sequence number of the data packet lost in the transmission process.

That the second access network device performs further processing on at least one of a data packet corresponding to the sequence number of the data packet not successfully sent to the terminal and a data packet corresponding to the sequence number of the data packet lost in the transmission process includes: if the sequence number state transition message carries the sequence number of the data packet not successfully sent to the terminal, resending, by the second access network device, a data packet corresponding to the sequence number of the data packet not successfully sent to the terminal; and if the sequence number state transition message carries the sequence number of the data packet lost in the transmission process, sending, by the second access network device, a retransmission request message, where the retransmission request message is used to request the terminal to resend a data packet corresponding to the sequence number of the data packet lost in the transmission process; or if the sequence number state transition message carries the sequence number of the data packet not successfully sent to the terminal and the sequence number of the data packet lost in the transmission process, resending, by the second access network device, a data packet corresponding to the sequence number of the data packet not successfully sent to the terminal, and sending a retransmission request message, where the retransmission request message is used to request the terminal to resend a data packet corresponding to the sequence number of the data packet lost in the transmission process.

A specific implementation process of requesting, by the second access network device, the terminal to resend the data packet corresponding to the sequence number of the data packet lost in the transmission process may include: sending, by the second access network device, a retransmission request to the terminal by using the target inter-RAT cell, where the retransmission request carries the sequence number of the data packet lost in the transmission process, and the retransmission request is used to instruct the terminal to resend the data packet corresponding to the sequence number of the data packet lost in the transmission process.

Certainly, it should be noted that in this embodiment of the present application, descriptions are provided only by using an example in which the foregoing method is used to implement that the second access network device requests the terminal to resend the data packet corresponding to the sequence number of the data packet lost in the transmission process. In another embodiment, another manner may alternatively be used to implement that the second access network device requests the terminal to resend the data packet corresponding to the sequence number of the data packet lost in the transmission process. This is not limited in this embodiment of the present application.

In this embodiment of the present application, in the process of the handover between the inter-RAT cells, the first access network device determines the target inter-RAT cell of the terminal based on the measurement report reported by the terminal, to be specific, determines the neighboring inter-RAT cell that the terminal prepares to access. Then, the first access network device sends, through the communications interface between the first access network device and the second access network device, the handover request message to the second access network device to which the target inter-RAT cell belongs, so that the second access network device configures the resource for the terminal in the target inter-RAT cell, and returns the information about the configured resource to the first access network device. The first access network device sends the information about the configured resource to the terminal, so that the terminal accesses the target inter-RAT cell. No core network needs to be crossed in the process of the handover between the inter-RAT cells, thereby reducing signaling exchange between a source core network and a target core network.

In addition, it should be noted herein that, that both the first access network device and the second access network device are base stations means that the RAN server is connected to an access point of only one RAT. In this case, it may be considered that the terminal is handed over between two inter-RAT base stations, and an interface exists between the two inter-RAT base stations. Specifically, referring to FIG. 5B, a first RAN server is connected to an access point of only one RAT, namely, an NR site, and the NR site may be a remote radio frequency transmitter, and all protocol layers of the NR site are deployed in the first RAN server. That is, the first RAN server and the NR site in this case can be used as a whole and considered as an NR base station. Similarly, a second RAN server is connected to an access point of only one RAT, namely, an LTE site, and the LTE site may also be a remote radio frequency transmitter, and all protocol layers of the LTE site are deployed in the second RAN server. That is, the second RAN server and the LTE site in this case can be used as a whole and considered as an LTE base station, namely, an eNB. In this case, this is equivalent to that the interface exists between the NR base station and the eNB. The terminal can hand over between the NR base station and the eNB. A specific implementation process of the handover is described above, and details are not described herein again.

Figure 6:
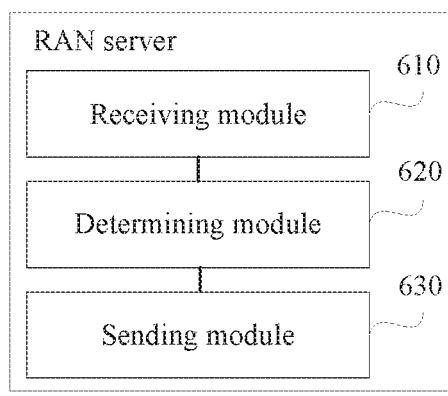
FIG. 6 is a schematic structural diagram of a RAN server according to an example of an embodiment.

FIG. 6 is a schematic structural diagram of a RAN server according to an example of an embodiment. The RAN server may be implemented by software, hardware, or a combination thereof. The RAN server may include:

a receiving module 610, configured to receive a measurement report sent by a terminal, where the measurement report includes an identifier of a neighboring inter-RAT cell of a serving cell in which the terminal is located and a measured value of the neighboring inter-RAT cell;

a determining module 620, configured to determine a target inter-RAT cell of the terminal based on the measurement report received by the receiving module 610, and configure a resource for the terminal in the target inter-RAT cell, where the configured resource is a resource to be used by the terminal to access the target inter-RAT cell; and a sending module 630, configured to send a handover command to the terminal, where the handover command is used to instruct the terminal to hand over to the target inter-RAT cell determined by the determining module 620, the handover command carries an identifier of the target inter-RAT cell and information about the configured resource, the RAN server is configured to manage the serving cell and the target inter-RAT cell of the terminal, and a communication RAT used by the serving cell is different from a communication RAT used by the target inter-RAT cell.

Optionally, the sending module 630 is further configured to:

send the information about the configured resource to an access point to which the target inter-RAT cell belongs, so that the access point performs resource configuration based on the information about the configured resource.

Optionally, the sending module 630 is further configured to:

send a RAT indication message to a core network device, where the RAT indication message carries an identifier of the terminal and RAT information of the target inter-RAT cell, and the RAT information is used to indicate the communication RAT used by the target inter-RAT cell.

In this embodiment of the present application, in a process of handover between inter-RAT cells, the RAN server determines the target inter-RAT cell of the terminal based on the measurement report reported by the terminal, to be specific, determines the neighboring inter-RAT cell that the terminal prepares to access. Then, the RAN server configures the resource for the terminal in the target inter-RAT cell, and sends the information about the configured resource and the identifier of the target inter-RAT cell to the terminal, so that the terminal is handed over to the target inter-RAT cell. No core network needs to be crossed in the process of the handover between the inter-RAT cells, thereby reducing signaling exchange between a source core network and a target core network.

The sending module 630 may be a transmitter or a transceiver, and the receiving module 610 may be a receiver or a transceiver. The sending module 630 and the receiving module 610 may be integrated together to form a transceiver module, which is a transceiver corresponding to hardware implementation. The determining module 620 may be embedded into or independently from a processor of the RAN server in a hardware form, or may be stored in a memory of the RAN server in a software form so that a processor invokes and performs operations corresponding to the foregoing various modules. The processor may be a central processing unit (CPU), a microprocessor, a single-chip microcomputer, or the like.

It should be noted that the RAN server shown in FIG. 6 may be specifically configured to perform the steps of the RAN server in FIG. 4, and details are not described again.

Figure 7:
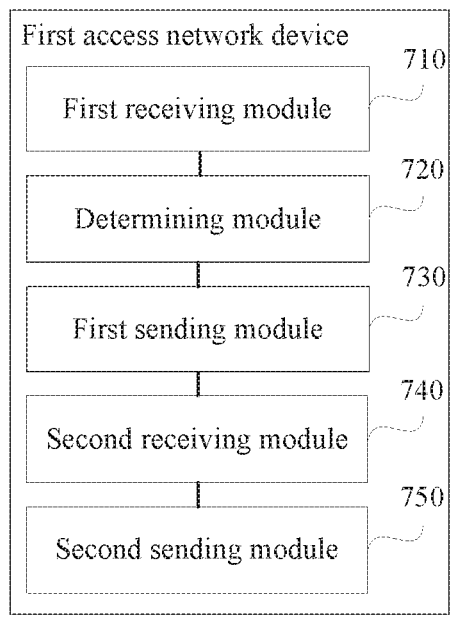
FIG. 7 is a schematic structural diagram of a first access network device according to an example of an embodiment.

FIG. 7 is a schematic structural diagram of a first access network device according to an example of an embodiment. The first access network device may be implemented by software, hardware, or a combination thereof. The first access network device may include:

a first receiving module 710, configured to receive a measurement report sent by a terminal, where the measurement report includes an identifier of a neighboring inter-RAT cell of a serving cell in which the terminal is located and a measured value of the neighboring inter-RAT cell;

a determining module 720, configured to determine a target inter-RAT cell of the terminal based on the measurement report received by the first receiving module 710;

a first sending module 730, configured to send a handover request message to a second access network device through a communications interface between the first access network device and the second access network device to which the target inter-RAT cell determined by the determining module 720 belongs, where the handover request message is used to request the second access network device to configure a resource for the terminal in the target inter-RAT cell, the handover request message carries an identifier of the terminal and an identifier of the target inter-RAT cell, and the configured resource is a resource to be used by the terminal to access the target inter-RAT cell;

a second receiving module 740, configured to receive, through the communications interface, a handover response message sent by the second access network device, where the handover response message carries information about the configured resource; and a second sending module 750, configured to send a handover command to the terminal, where the handover command is used to instruct the terminal to hand over to the target inter-RAT cell, and the handover command carries the identifier of the target inter-RAT cell and the information about the configured resource that is received by the second receiving module 740.

A communication RAT used by the serving cell is different from a communication RAT used by the target inter-RAT cell.

Optionally, both the first access network device and the second access network device are radio access network RAN servers; or both the first access network device and the second access network device are base stations.

Optionally, the second sending module 750 is further configured to:

send a sequence number state transition message to the second access network device, where the sequence number state transition message carries at least one of a sequence number of a data packet not successfully sent to the terminal and a sequence number of a data packet lost in a transmission process, the sequence number of the data packet not successfully sent to the terminal is used by the second access network device to resend a data packet corresponding to the sequence number of the data packet not successfully sent to the terminal, and the sequence number of the data packet lost in the transmission process is used by the second access network device to request the terminal to resend a data packet corresponding to the sequence number of the data packet lost in the transmission process.

Optionally, the first receiving module 710 is further configured to:

receive, when a communication connection between the first access network device and the second access network device is established, a device identifier of the second access network device, and cell identifiers and communication RAT information of all cells managed by the second access network device that are sent by the second access network device.

In this embodiment of the present application, after the first access network device determines the target inter-RAT cell of the terminal based on the measurement report, when an access point to which the target inter-RAT cell belongs does not belong to the first access network device, the first access network device sends the handover request message to the second access network device through the communications interface between the first access network device and the second access network device to which the target inter-RAT cell belongs, so that the second access network device configures the resource for the terminal in the target inter-RAT cell, and returns the information about the configured resource to the first access network device. Then, the first access network device sends the information about the configured resource and the identifier of the target inter-RAT cell to the terminal, so that the terminal is handed over to the target inter-RAT cell. No core network needs to be crossed in a process of handover between inter-RAT cells, thereby reducing signaling exchange between a source core network and a target core network.

The first sending module 730 and the second sending module 750 may be transmitters or transceivers, and the first receiving module 710 and the second receiving module 740 may be receivers or transceivers. The first sending module 730, the second sending module 750, the first receiving module 710, and the second receiving module 740 may be integrated together to form a transceiver module, which is a transceiver corresponding to hardware implementation. The determining module 720 may be embedded into or independently from a processor of the first access network device in a hardware form, or may be stored in a memory of the first access network device in a software form so that a processor invokes and performs operations corresponding to the foregoing various modules. The processor may be a central processing unit (CPU), a microprocessor, a single-chip microcomputer, or the like.

It should be noted that the first access network device shown in FIG. 7 may be specifically configured to perform the steps of the first access network device in FIG. 5A-1 and FIG. 5A-2, and details are not described again.

Figure 8:
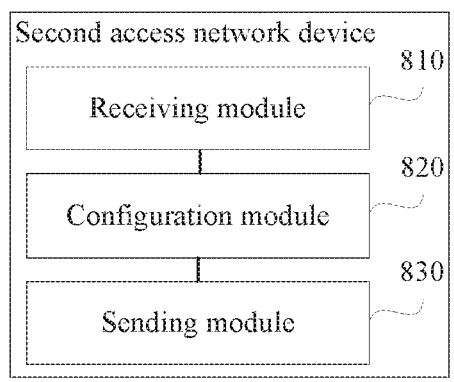
FIG. 8 is a schematic structural diagram of a second access network device according to an example of an embodiment.

FIG. 8 is a schematic structural diagram of a second access network device according to an example of an embodiment. The second access network device may be implemented by software, hardware, or a combination thereof. The second access network device may include:

a receiving module 810, configured to receive a handover request message sent by a first access network device, where the handover request message carries an identifier of a terminal and an identifier of a target inter-RAT cell, and the first access network device is an access network device to which a serving cell in which the terminal is located belongs;

a configuration module 820, configured to configure a resource for the terminal in the target inter-RAT cell based on the handover request message received by the receiving module 810; and a sending module 830, configured to send a handover response message to the first access network device, where the handover response message carries information about the resource configured by the configuration module 820.

A communication RAT used by the serving cell is different from a communication RAT used by the target inter-RAT cell.

Optionally, both the first access network device and the second access network device are radio access network RAN servers; or both the first access network device and the second access network device are base stations.

Optionally, the sending module 830 is further configured to send a path switching request message to a core network device. The path switching request message carries RAT information of the target inter-RAT cell, and the RAT information is used to indicate the communication RAT used by the target inter-RAT cell.

The receiving module 810 is further configured to receive a path switching response message sent by the core network device. The path switching response message carries data channel information, and the data channel information is used to indicate a channel for transmitting data between the core network device and the terminal.

Optionally, the sending module 830 is further configured to:

send the information about the configured resource to a target access point to which the target inter-RAT cell belongs, so that the target access point performs resource configuration based on the information about the configured resource.

Optionally, the receiving module 810 is further configured to receive a sequence number state transition message sent by the first access network device. The sequence number state transition message carries at least one of a sequence number of a data packet not successfully sent to the terminal and a sequence number of a data packet lost in a transmission process.

The sending module 830 is further configured to: when the sequence number state transition message received by the receiving module 810 carries the sequence number of the data packet not successfully sent to the terminal, resend a data packet corresponding to the sequence number of the data packet not successfully sent to the terminal.

The sending module 830 is further configured to: when the sequence number state transition message received by the receiving module 810 carries the sequence number of the data packet lost in the transmission process, send a retransmission request message. The retransmission request message is used to request the terminal to resend a data packet corresponding to the sequence number of the data packet lost in the transmission process.

Optionally, the sending module 830 is further configured to:

send, when a communication connection between the first access network device and the second access network device is established, a device identifier of the second access network device, and cell identifiers and communication RAT information of all cells managed by the second access network device to the first access network device.

In this embodiment of the present application, in a process of handover between inter-RAT cells, when the access point to which the target inter-RAT cell belongs does not belong to the first access network device, the first access network device sends the handover request message to the second access network device to which the target inter-RAT cell belongs. Correspondingly, after receiving the handover request message, the second access network device configures the resource for the terminal in the target inter-RAT cell based on the identifier of the terminal and the identifier of the target inter-RAT cell that are carried in the handover request message, and sends the information about the configured resource to the first access network device. The first access network device sends the information about the configured resource and the identifier of the target inter-RAT cell to the terminal, so that the terminal is handed over to the target inter-RAT cell. No core network needs to be crossed in the process of the handover between the inter-RAT cells, thereby reducing signaling exchange between a source core network and a target core network.

The sending module 830 may be a transmitter or a transceiver, and the receiving module 810 may be a receiver or a transceiver. The sending module 830 and the receiving module 810 may be integrated together to form a transceiver module, which is a transceiver corresponding to hardware implementation. The configuration module 820 may be embedded into or independently from a processor of the second access network device in a hardware form, or may be stored in a memory of the second access network device in a software form so that a processor invokes and performs operations corresponding to the foregoing various modules. The processor may be a central processing unit (CPU), a microprocessor, a single-chip microcomputer, or the like.

It should be noted that the second access network device shown in FIG. 8 may be specifically configured to perform the steps of the second access network device in FIG. 5A-1 and FIG. 5A-2, and details are not described again.

Figure 9:
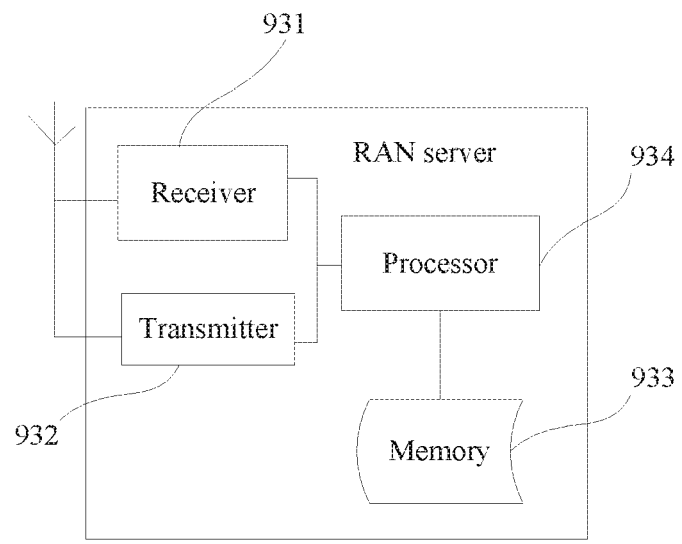
FIG. 9 is a schematic structural diagram of a RAN server 900 according to an example of another embodiment.

FIG. 9 is a block diagram of a RAN server 900 according to an example of an embodiment. The RAN server 900 can implement the method for handover between inter-RAT cells provided in the present application. The RAN server 900 includes a transmitter 932, a receiver 931, a memory 933, and a processor 934 connected to all of the transmitter 932, the receiver 931, and the memory 933.

The receiver 931 is configured to receive a measurement report sent by a terminal. The measurement report includes an identifier of a neighboring inter-RAT cell of a serving cell in which the terminal is located and a measured value of the neighboring inter-RAT cell.

The processor 934 is configured to determine a target inter-RAT cell of the terminal based on the measurement report received by the receiver 931, and configure a resource for the terminal in the target inter-RAT cell. The configured resource is a resource to be used by the terminal to access the target inter-RAT cell.

The transmitter 932 is configured to send a handover command to the terminal. The handover command is used to instruct the terminal to hand over to the target inter-RAT cell determined by the processor 934, and the handover command carries an identifier of the target inter-RAT cell and information about the configured resource. The RAN server is configured to manage the serving cell and the target inter-RAT cell of the terminal, and a communication RAT used by the serving cell is different from a communication RAT used by the target inter-RAT cell.

Optionally, the transmitter 932 is further configured to:
send the information about the configured resource to an access point to which the target inter-RAT cell belongs, so that the access point performs resource configuration based on the information about the configured resource.

Optionally, the transmitter 932 is further configured to:
send a RAT indication message to a core network device, where the RAT indication message carries an identifier of the terminal and RAT information of the target inter-RAT cell, and the RAT information is used to indicate the communication RAT used by the target inter-RAT cell.

The memory 933 is configured to store one or more execution programs, and the processor 934 executes the one or more execution programs, to implement the method for handover between inter-RAT cells.

In this embodiment of the present application, in a process of handover between inter-RAT cells, the RAN server determines the target inter-RAT cell of the terminal based on the measurement report reported by the terminal, to be specific, determines the neighboring inter-RAT cell that the terminal prepares to access. Then, the RAN server configures the resource for the terminal in the target inter-RAT cell, and sends the information about the configured resource and the identifier of the target inter-RAT cell to the terminal, so that the terminal is handed over to the target inter-RAT cell. No core network needs to be crossed in the process of the handover between the inter-RAT cells, thereby reducing signaling exchange between a source core network and a target core network.

Figure 10:
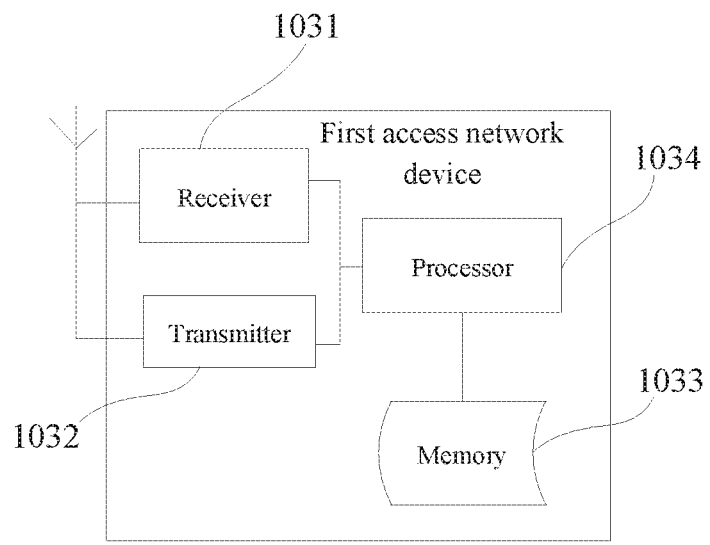
FIG. 10 is a schematic structural diagram of a first access network device 1000 according to an example of another embodiment.

FIG. 10 is a block diagram of a first access network device 1000 according to an example of an embodiment. The first access network device 1000 can implement the method for handover between inter-RAT cells provided in the present application. The first access network device includes a transmitter 1032, a receiver 1031, a memory 1033, and a processor 1034 connected to all of the transmitter 1032, the receiver 1031, and the memory 1033.

The receiver 1031 is configured to receive a measurement report sent by a terminal. The measurement report includes an identifier of a neighboring inter-RAT cell of a serving cell in which the terminal is located and a measured value of the neighboring inter-RAT cell.

The processor 1033 is configured to determine a target inter-RAT cell of the terminal based on the measurement report received by the receiver 1031.

The transmitter 1032 is configured to send a handover request message to a second access network device through a communications interface between the first access network device and the second access network device to which the target inter-RAT cell determined by the processor 1033 belongs. The handover request message is used to request the second access network device to configure a resource for the terminal in the target inter-RAT cell, the handover request message carries an identifier of the terminal and an identifier of the target inter-RAT cell, and the configured resource is a resource to be used by the terminal to access the target inter-RAT cell.

The receiver 1031 is further configured to receive, through the communications interface, a handover response message sent by the second access network device. The handover response message carries information about the configured resource.

The transmitter 1032 is further configured to send a handover command to the terminal. The handover command is used to instruct the terminal to hand over to the target inter-RAT cell, and the handover command carries the identifier of the target inter-RAT cell and the information about the configured resource that is received by the receiver 1031.

A communication RAT used by the serving cell is different from a communication RAT used by the target inter-RAT cell.

Optionally, both the first access network device and the second access network device are radio access network RAN servers; or both the first access network device and the second access network device are base stations.

Optionally, the transmitter 1032 is further configured to:
send a sequence number state transition message to the second access network device, where the sequence number state transition message carries at least one of a sequence number of a data packet not successfully sent to the terminal and a sequence number of a data packet lost in a transmission process, the sequence number of the data packet not successfully sent to the terminal is used by the second access network device to resend a data packet corresponding to the sequence number of the data packet not successfully sent to the terminal, and the sequence number of the data packet lost in the transmission process is used by the second access network device to request the terminal to resend a data packet corresponding to the sequence number of the data packet lost in the transmission process.

Optionally, the receiver 1031 is further configured to:
receive, when a communication connection between the first access network device and the second access network device is established, a device identifier of the second access network device, and cell identifiers and communication RAT information of all cells managed by the second access network device that are sent by the second access network device.

The memory 1033 is configured to store one or more execution programs, and the processor 1034 executes the one or more execution programs, to implement the method for handover between inter-RAT cells.

In this embodiment of the present application, after the first access network device determines the target inter-RAT cell of the terminal based on the measurement report, when an access point to which the target inter-RAT cell belongs does not belong to the first access network device, the first access network device sends the handover request message to the second access network device through the communications interface between the first access network device and the second access network device to which the target inter-RAT cell belongs, so that the second access network device configures the resource for the terminal in the target inter- RAT cell, and returns the information about the configured resource to the first access network device. Then, the first access network device sends the information about the configured resource and the identifier of the target inter-RAT cell to the terminal, so that the terminal is handed over to the target inter-RAT cell. No core network needs to be crossed in a process of handover between inter-RAT cells, thereby reducing signaling exchange between a source core network and a target core network.

Figure 11:
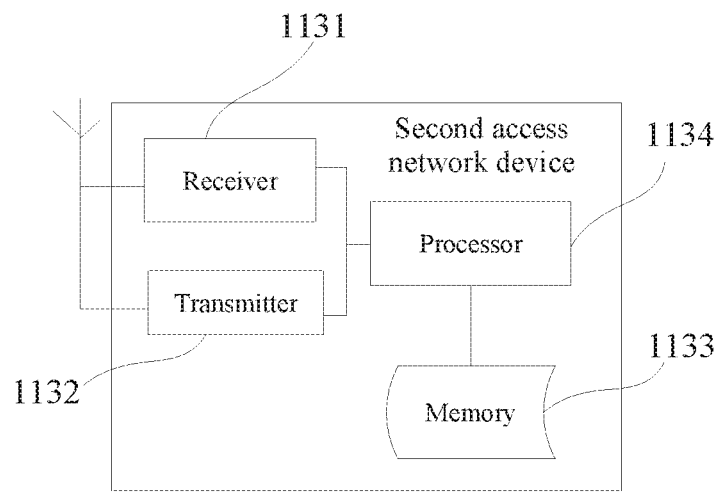
FIG. 11 is a schematic structural diagram of a second access network device 1100 according to an example of another embodiment.

FIG. 11 is a block diagram of a second access network device 1100 according to an example of an embodiment. The second access network device 1100 can implement the method for handover between inter-RAT cells provided in the present application. The second access network device includes a transmitter 1132, a receiver 1131, a memory 1133, and a processor 1134 connected to all of the transmitter 1132, the receiver 1131, and the memory 1133.

The receiver 1131 is configured to receive a handover request message sent by a first access network device, where the handover request message carries an identifier of a terminal and an identifier of a target inter-RAT cell, and the first access network device is an access network device to which a serving cell in which the terminal is located belongs.

The processor 1134 is configured to configure a resource for the terminal in the target inter-RAT cell based on the handover request message received by the receiver 1131.

The transmitter 1132 is configured to send a handover response message to the first access network device. The handover response message carries information about the resource configured by the receiver 1131, and a communication RAT used by the serving cell is different from a communication RAT used by the target inter-RAT cell.

Optionally, both the first access network device and the second access network device are radio access network RAN servers; or both the first access network device and the second access network device are base stations.

Optionally, the transmitter 1132 is further configured to send a path switching request message to a core network device. The path switching request message carries RAT information of the target inter-RAT cell, and the RAT information is used to indicate the communication RAT used by the target inter-RAT cell.

The receiver 1131 is further configured to receive a path switching response message sent by the core network device. The path switching response message carries data channel information, and the data channel information is used to indicate a channel for transmitting data between the core network device and the terminal.

Optionally, the transmitter 1132 is further configured to: send the information about the configured resource to a target access point to which the target inter-RAT cell belongs, so that the target access point performs resource configuration based on the information about the configured resource.

Optionally, the receiver 1131 is further configured to receive a sequence number state transition message sent by the first access network device. The sequence number state transition message carries at least one of a sequence number of a data packet not successfully sent to the terminal and a sequence number of a data packet lost in a transmission process.

The transmitter 1132 is further configured to: when the sequence number state transition message received by the receiver 1131 carries the sequence number of the data packet not successfully sent to the terminal, resend a data packet corresponding to the sequence number of the data packet not successfully sent to the terminal; and/or the transmitter 1132 is further configured to: when the sequence number state transition message received by the receiver 1131 carries the sequence number of the data packet lost in the transmission process, send a retransmission request message, where the retransmission request message is used to request the terminal to resend a data packet corresponding to the sequence number of the data packet lost in the transmission process.

Optionally, the transmitter 1132 is further configured to: send, when a communication connection between the first access network device and the second access network device is established, a device identifier of the second access network device, and cell identifiers and communication RAT information of all cells managed by the second access network device to the first access network device.

The memory 1133 is configured to store one or more execution programs, and the processor 1134 executes the one or more execution programs, to implement the method for handover between inter-RAT cells.

In this embodiment of the present application, in a process of handover between inter-RAT cells, when the access point to which the target inter-RAT cell belongs does not belong to the first access network device, the first access network device sends the handover request message to the second access network device to which the target inter-RAT cell belongs. Correspondingly, after receiving the handover request message, the second access network device configures the resource for the terminal in the target inter-RAT cell based on the identifier of the terminal and the identifier of the target inter-RAT cell that are carried in the handover request message, and sends the information about the configured resource to the first access network device. The first access network device sends the information about the configured resource and the identifier of the target inter-RAT cell to the terminal, so that the terminal is handed over to the target inter-RAT cell. No core network needs to be crossed in the process of the handover between the inter-RAT cells, thereby reducing signaling exchange between a source core network and a target core network.

Figure 12:
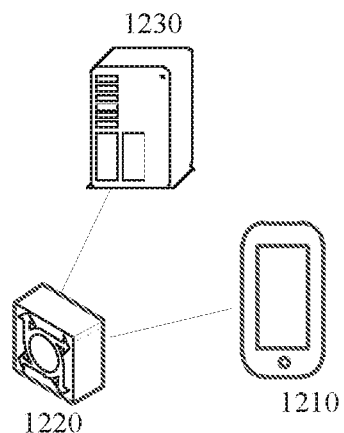
FIG. 12 is a block diagram of a system according to an example of an embodiment.

FIG. 12 is a block diagram of a system according to an example of an embodiment. The system can implement the method for handover between inter-RAT cells provided in the present application. The system mainly includes a terminal 1210 and a RAN server 1220. The terminal 1210 can communicate with the RAN server 1220 by using an access point connected to the RAN server 1220.

The terminal 1210 is configured to send a measurement report to the RAN server 1220. The measurement report includes an identifier of a neighboring inter-RAT cell of a serving cell in which the terminal is located and a measured value of the neighboring inter-RAT cell.

The RAN server 1220 is configured to receive the measurement report, determine a target inter-RAT cell of the terminal 1210 based on the measurement report, and configure a resource for the terminal 1210 in the target inter-RAT cell. The configured resource is a resource to be used by the terminal 1210 to access the target inter-RAT cell.

The RAN server 1220 is further configured to send a handover command to the terminal 1210. The handover command carries at least an identifier of the target inter-RAT cell and information about the configured resource.

The terminal 1210 is further configured to hand over to the target inter-RAT cell based on the handover command. A communication RAT used by the serving cell is different from a communication RAT used by the target inter-RAT cell.

Further, the system may further include a core network device 1230. A communication connection is established between the RAN server 1220 and the core network device 1230.

Optionally, before the RAN server 1220 sends the handover command to the terminal 1210, the RAN server 1220 is further configured to send the information about the configured resource to an access point to which the target inter-RAT cell belongs, so that the access point performs resource configuration based on the information about the configured resource.

Optionally, after the RAN server 1220 sends the handover command to the terminal 1210, the RAN server 1220 is further configured to send a RAT indication message to the core network device 1230. The RAT indication message carries an identifier of the terminal 1210 and RAT information of the target inter-RAT cell, and the RAT information is used to indicate the communication RAT used by the target inter-RAT cell.

In this embodiment of the present application, in a process of handover between inter-RAT cells, the RAN server determines the target inter-RAT cell of the terminal based on the measurement report reported by the terminal, to be specific, determines the neighboring inter-RAT cell that the terminal prepares to access. Then, the RAN server configures the resource for the terminal in the target inter-RAT cell, and sends the information about the configured resource and the identifier of the target inter-RAT cell to the terminal, so that the terminal is handed over to the target inter-RAT cell. No core network needs to be crossed in the process of the handover between the inter-RAT cells, thereby reducing signaling exchange between a source core network and a target core network.

Figure 13:
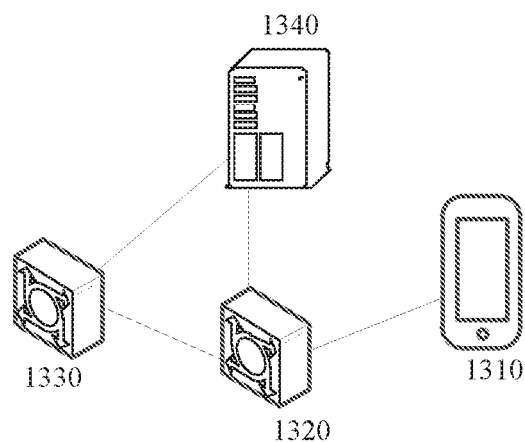
FIG. 13 is a block diagram of a system according to an example of another embodiment.

FIG. 13 is a block diagram of a system according to an example of another embodiment. The system can implement the method for handover between inter-RAT cells provided in the present application. The system mainly includes a terminal 1310, a first access network device 1320, and a second access network device 1330. The terminal 1310 can communicate with the first access network device 1320 by using an access point connected to the first access network device 1320. A communications interface exists between the first access network device 1320 and the second access network device 1330. That is, the first access network device 1320 can communicate with the second access network device 1330.

The terminal 1310 is configured to send a measurement report to the first access network device 1320. The measurement report includes an identifier of a neighboring inter-RAT cell of a serving cell in which the terminal is located and a measured value of the neighboring inter-RAT cell.

The first access network device 1320 is configured to receive the measurement report, and determine a target inter-RAT cell of the terminal 1310 based on the measurement report.

The first access network device 1320 is further configured to send a handover request message to the second access network device 1330 through the communications interface between the first access network device 1320 and the second access network device 1330 to which the target inter-RAT cell belongs.

The second access network device 1330 is configured to configure a resource for the terminal 1310 in the target inter-RAT cell based on the handover request message. The handover request message carries an identifier of the terminal 1310 and an identifier of the target inter-RAT cell, and the configured resource is a resource to be used by the terminal 1310 to access the target inter-RAT cell.

The second access network device 1330 is further configured to send a handover response message to the first access network device 1320 through the communications interface. The handover response message carries information about the configured resource.

The first access network device 1320 is further configured to send a handover command to the terminal 1310 through the communications interface. The handover command carries the identifier of the target inter-RAT cell and the information about the configured resource.

The terminal 1310 is further configured to hand over to the target inter-RAT cell based on the handover command. A communication RAT used by the serving cell is different from a communication RAT used by the target inter-RAT cell.

Further, the system further includes a core network device 1340. The core network device 1340 establishes a communication connection to the first access network device 1320 and the second access network device 1330 separately. That is, the core network device 1340 is configured to manage the first access network device 1320 and the second access network device 1330.

Optionally, both the first access network device 1320 and the second access network device 1330 are radio access network RAN servers, or both the first access network device 1320 and the second access network device 1330 are base stations.

Optionally, after the first access network device 1320 sends the handover command to the terminal 1310, the first access network device 1320 is further configured to send a sequence number state transition message to the second access network device 1330. The sequence number state transition message carries at least one of a sequence number of a data packet not successfully sent to the terminal and a sequence number of a data packet lost in a transmission process, the sequence number of the data packet not successfully sent to the terminal is used by the second access network device to resend a data packet corresponding to the sequence number of the data packet not successfully sent to the terminal, and the sequence number of the data packet lost in the transmission process is used by the second access network device to request the terminal to resend a data packet corresponding to the sequence number of the data packet lost in the transmission process.

Optionally, before the first access network device 1320 receives the measurement report sent by the terminal 1310, the first access network device 1320 is further configured to:

receive, when the communication connection between the first access network device 1320 and the second access network device 1330 is established, a device identifier of the second access network device 1330, and cell identifiers and communication RAT information of all cells managed by the second access network device 1330 that are sent by the second access network device 1330.

After sending the handover response message to the first access network device 1320, the second access network device 1330 further sends a path switching request message to the core network device 1340. The path switching request message carries RAT information of the target inter-RAT cell, and the RAT information is used to indicate the communication RAT used by the target inter-RAT cell.

The second access network device 1330 receives a path switching response message sent by the core network device 1340. The path switching response message carries data channel information, and the data channel information is used to indicate a channel for transmitting data between the core network device 1340 and the terminal 1310.

Optionally, before the second access network device 1330 sends the handover response message to the first access network device 1320, the second access network device 1330 is further configured to send the information about the configured resource to a target access point to which the target inter-RAT cell belongs, so that the target access point performs resource configuration based on the information about the configured resource.

Optionally, after receiving the path switching response message sent by the core network device 1340, the second access network device 1330 is further configured to receive a sequence number state transition message sent by the first access network device 1320. The sequence number state transition message carries at least one of the sequence number of the data packet not successfully sent to the terminal and the sequence number of the data packet lost in the transmission process.

If the sequence number state transition message carries the sequence number of the data packet not successfully sent to the terminal, the second access network device 1330 resends a data packet corresponding to the sequence number of the data packet not successfully sent to the terminal; and/or if the sequence number state transition message carries the sequence number of the data packet lost in the transmission process, the second access network device 1330 sends a retransmission request message. The retransmission request message is used to request the terminal to resend a data packet corresponding to the sequence number of the data packet lost in the transmission process.

Optionally, before the second access network device 1330 receives the handover request message sent by the first access network device 1320, the second access network device 1330 is further configured to:

send, when the communication connection between the first access network device 1320 and the second access network device 1330 is established, the device identifier of the second access network device 1330, the cell identifiers and the communication RAT information of all the cells managed by the second access network device 1330 to the first access network device 1320.

In this embodiment of the present application, in a process of handover between inter-RAT cells, the first access network device determines the target inter-RAT cell of the terminal based on the measurement report reported by the terminal, to be specific, determines the neighboring inter-RAT cell that the terminal prepares to access. Then, the first access network device sends, through the communications interface between the first access network device and the second access network device, the handover request message to the second access network device to which the target inter-RAT cell belongs, so that the second access network device configures the resource for the terminal in the target inter-RAT cell, and returns the information about the configured resource to the first access network device. The first access network device sends the information about the configured resource to the terminal, so that the terminal accesses the target inter-RAT cell. No core network needs to be crossed in the process of the handover between the inter-RAT cells, thereby reducing signaling exchange between a source core network and a target core network.

A person of ordinary skill in the art may understand that all or some of the steps of the embodiments may be implemented by hardware or a program instructing related hardware. The program may be stored in a computer-readable storage medium. The storage medium may include a read-only memory, a magnetic disk, an optical disc, and the like.

The foregoing descriptions are merely examples of the embodiments of the present application, but are not intended to limit the present application. Any modification, equivalent replacement, and improvement made without departing from the spirit and principle of the present application shall fall within the protection scope of the present application.

What is claimed is:

1. A radio access network (RAN) server, wherein the RAN server comprises a transmitter, a receiver, and a processor connected to both the transmitter and the receiver, wherein
   the receiver is configured to receive a measurement report from a terminal, wherein the measurement report comprises an identifier of a neighboring inter-RAT cell of a serving cell in which the terminal is located and a measured value of the neighboring inter-RAT cell;
   the processor is configured to determine a target inter-RAT cell of the terminal based on the measurement report received by the receiver, and configure a resource for the terminal in the target inter-RAT cell, wherein the configured resource is a resource to be used by the terminal to access the target inter-RAT cell; and
   the transmitter is configured to send a handover command to the terminal, wherein the handover command is used to instruct the terminal to hand over to the target inter-RAT cell determined by the processor, and the handover command carries an identifier of the target inter-RAT cell and information about the configured resource, wherein
   the RAN server is configured to manage the serving cell and the target inter-RAT cell of the terminal, and a communication RAT used by the serving cell is different from a communication RAT used by the target inter-RAT cell.

2. The RAN server according to claim 1, wherein the transmitter is further configured to:
   send the information about the configured resource to an access point to which the target inter-RAT cell belongs, so that the access point performs resource configuration based on the information about the configured resource.

3. The RAN server according to claim 1, wherein the transmitter is further configured to:
   send a RAT indication message to a core network device, wherein the RAT indication message carries an identifier of the terminal and RAT information of the target inter-RAT cell, and the RAT information is used to indicate the communication RAT used by the target inter-RAT cell.

4. A first access network device, wherein the first access network device comprises a transmitter, a receiver, and a processor connected to both the transmitter and the receiver, wherein
   the receiver is configured to receive a measurement report from a terminal, wherein the measurement report comprises an identifier of a neighboring inter-RAT cell of a serving cell in which the terminal is located and a measured value of the neighboring inter-RAT cell;
   the processor is configured to determine a target inter-RAT cell of the terminal based on the measurement report received by the receiver;
   the transmitter is configured to send a handover request message to a second access network device through a communications interface between the first access network device and the second access network device to which the target inter-RAT cell determined by the processor belongs, wherein the handover request message is used to request the second access network device to configure a resource for the terminal in the target inter-RAT cell, the handover request message carries an identifier of the terminal and an identifier of the target inter-RAT cell, and the configured resource is a resource to be used by the terminal to access the target inter-RAT cell;

the receiver is further configured to receive, through the communications interface, a handover response message from the second access network device, wherein the handover response message carries information about the configured resource; and the transmitter is further configured to send a handover command to the terminal, wherein the handover command is used to instruct the terminal to hand over to the target inter-RAT cell, and the handover command carries the identifier of the target inter-RAT cell and the information about the configured resource that is received by the receiver, wherein a communication RAT used by the serving cell is different from a communication RAT used by the target inter-RAT cell.

5. The first access network device according to claim 4, wherein both the first access network device and the second access network device are radio access network (RAN) servers; or both the first access network device and the second access network device are base stations.

6. The first access network device according to claim 4, wherein the transmitter is further configured to:

send a sequence number state transition message to the second access network device, wherein the sequence number state transition message carries at least one of a sequence number of a data packet not successfully sent to the terminal and a sequence number of a data packet lost in a transmission process, the sequence number of the data packet not successfully sent to the terminal is used by the second access network device to resend the data packet not successfully sent to the terminal, and the sequence number of the data packet lost in the transmission process is used by the second access network device to request the terminal to resend a data packet corresponding to the sequence number of the data packet lost in the transmission process.

7. The first access network device according to claim 4, wherein the receiver is further configured to:

receive, when a communication connection between the first access network device and the second access network device is established, a device identifier of the second access network device, and cell identifiers and communication RAT information of all cells managed by the second access network device that are from the second access network device.

8. A second access network device, wherein the second access network device comprises a transmitter, a receiver, and a processor connected to both the transmitter and the receiver, wherein the receiver is configured to receive a handover request message from a first access network device, wherein the handover request message carries an identifier of a terminal and an identifier of a target inter-RAT cell, and the first access network device is an access network device to which a serving cell in which the terminal is located belongs;

the processor is configured to configure a resource for the terminal in the target inter-RAT cell based on the handover request message received by the receiver; and the transmitter is configured to send a handover response message to the first access network device, wherein the handover response message carries information about the resource configured by the processor, wherein a communication RAT used by the serving cell is different from a communication RAT used by the target inter-RAT cell.

9. The second access network device according to claim 8, wherein both the first access network device and the second access network device are radio access network (RAN) servers; or both the first access network device and the second access network device are base stations.

10. The second access network device according to claim 8, wherein the transmitter is further configured to send a path switching request message to a core network device, wherein the path switching request message carries RAT information of the target inter-RAT cell, and the RAT information is used to indicate the communication RAT used by the target inter-RAT cell; and the receiver is further configured to receive a path switching response message from the core network device, wherein the path switching response message carries data channel information, and the data channel information is used to indicate a channel for transmitting data between the core network device and the terminal.

11. The second access network device according to claim 8, wherein the transmitter is further configured to:

send the information about the configured resource to a target access point to which the target inter-RAT cell belongs, so that the target access point performs resource configuration based on the information about the configured resource.

12. The second access network device according to claim 8, wherein the receiver is further configured to receive a sequence number state transition message from the first access network device, wherein the sequence number state transition message carries at least one of a sequence number of a data packet not successfully sent to the terminal and a sequence number of a data packet lost in a transmission process; and the transmitter is further configured to: when the sequence number state transition message received by the receiver carries the sequence number of the data packet not successfully sent to the terminal, resend a data packet corresponding to the sequence number of the data packet not successfully sent to the terminal; and/or the transmitter is further configured to: when the sequence number state transition message received by the receiver carries the sequence number of the data packet lost in the transmission process, send a retransmission request message, wherein the retransmission request message is used to request the terminal to resend a data packet corresponding to the sequence number of the data packet lost in the transmission process.

13. The second access network device according to claim 8, wherein the transmitter is further configured to:

send, when a communication connection between the first access network device and the second access network device is established, a device identifier of the second access network device, and cell identifiers and communication RAT information of all cells managed by the second access network device to the first access network device.

\* \* \* \* \*